US012621657B2

(12) United States Patent
Li et al.

(10) Patent No.: US 12,621,657 B2
(45) Date of Patent: May 5, 2026

(54) SECURE COMMUNICATION METHOD AND DEVICE

(71) Applicant: Huawei Technologies Co., Ltd., Shenzhen (CN)

(72) Inventors: He Li, Shanghai (CN); Yizhuang Wu, Beijing (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 18/348,473

(22) Filed: Jul. 7, 2023

(65) Prior Publication Data

US 2023/0354013 A1      Nov. 2, 2023

Related U.S. Application Data

(63) Continuation of application No. PCT/CN2021/070979, filed on Jan. 8, 2021.

(51) Int. Cl.
    H04W 12/02          (2009.01)
    H04W 12/72          (2021.01)

(52) U.S. Cl.
    CPC ........... H04W 12/02 (2013.01); H04W 12/72 (2021.01)

(58) Field of Classification Search
    CPC ............... H04W 12/02; H04W 12/037; H04W 12/0431; H04W 12/06; H04W 12/72; H04L 2209/80; H04L 9/0844
    USPC ........................................................ 455/411
    See application file for complete search history.

(56) References Cited

U.S. PATENT DOCUMENTS

| | | | |
|---|---|---|---|
| 8,812,567 B1 | 8/2014 | Caklovic | |
| 2011/0145296 A1 | 6/2011 | Ellison et al. | |
| 2012/0039472 A1* | 2/2012 | Liu ..................... | H04W 12/041 |
| | | | 380/270 |
| 2017/0006469 A1* | 1/2017 | Palanigounder ...... | H04L 9/0841 |
| 2020/0068391 A1 | 2/2020 | Liu et al. | |
| 2021/0185523 A1* | 6/2021 | Targali ............. | H04W 12/0471 |
| 2022/0086632 A1* | 3/2022 | Wang .................. | H04L 63/0869 |
| 2022/0337408 A1* | 10/2022 | You ......................... | H04L 63/06 |

FOREIGN PATENT DOCUMENTS

| | | |
|---|---|---|
| WO | 2020145064 A1 | 7/2020 |
| WO | 2020146974 A1 | 7/2020 |
| WO | 2020249861 A1 | 12/2020 |

OTHER PUBLICATIONS

3GPP, "3rd Generation Partnership Project Technical Specification Group Services and System Aspects Proximity-based Services (ProSe) Security aspects (Release 16)", 3GPP TS 33.303 V16.0.0 Technical Specification, Jul. 31, 2020, 90 pages.

(Continued)

*Primary Examiner* — Hirdepal Singh
(74) *Attorney, Agent, or Firm* — Slater Matsil, LLP

(57) ABSTRACT

A method includes: User equipment determines whether confidentiality protection is activated for communication data between the user equipment and an application function device. The user equipment sends a user plane message to the application function device. The user plane message includes an identifier of the user equipment, and the identifier is an encrypted identifier in a case in which the confidentiality protection is inactivated.

20 Claims, 12 Drawing Sheets

(56)                      References Cited

OTHER PUBLICATIONS

3GPP, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.0.0 Technical Specification, Dec. 2020, 20 pages.

Wright, "Kernel Korner—Unionfs: Bringing Filesystems Together," Dec. 1, 2004, total 9 pages.

* cited by examiner

SECURE COMMUNICATION METHOD AND DEVICE

CROSS-REFERENCE TO RELATED APPLICATIONS

This application is a continuation of International Application No. PCT/CN2021/070979, filed on Jan. 8, 2021, the disclosure of which is hereby incorporated by reference in its entirety.

TECHNICAL FIELD

This application relates to the field of communication technologies, and in particular, to a secure communication method and a device.

BACKGROUND

With rapid development of network technologies, network security becomes an increasingly prominent issue. In an existing internet of things security framework, a secure tunnel may be established between user equipment (UE) and an application function (AF) server by using a generic bootstrapping architecture (GBA) technology. The GBA technology includes GBA authentication and key agreement (AKA) authentication. In addition, with development of the 5th generation (5G) mobile communication, currently, a secure tunnel may alternatively be established between UE and an AF by using a 5G network, that is, a secure communication technology is implemented between the UE and a third-party application server by using the 5G network. For example, the secure communication technology includes an authentication and key management for applications (AKMA) technology in the 5G network.

Although the foregoing technology has been used to securely protect information exchanged between the user equipment and a core network device, in an existing communication scenario, for example, in a device-to-device (D2D) communication scenario, a permanent identifier of the user equipment is still leaked during interaction between the user equipment and another device, resulting in a risk of exposing user privacy.

In conclusion, how to reduce a risk of leaking the identifier of the user equipment during interaction between the user equipment and the another device to reduce the risk of exposing user privacy is a technical problem urgently to be resolved by a person skilled in the art.

SUMMARY

This application provides a secure communication method and a device, to reduce a risk of leaking a permanent identifier of user equipment during interaction between the user equipment and another device to reduce a risk of exposing user privacy.

According to a first aspect, this application provides a secure communication method. The method includes: user equipment determines whether confidentiality protection is activated for communication data between the user equipment and an application function device; and the user equipment sends a user plane message to the application function device, where the user plane message includes an identifier of the user equipment, and the identifier is an encrypted identifier in a case in which the confidentiality protection is inactivated.

In this application, when the confidentiality protection between the user equipment and the application function device is inactivated, the encrypted identifier is used as the identifier of the user equipment that is carried in the user plane message, and the encrypted identifier is obtained by performing processing, for example, encryption, on a permanent identifier of the user equipment, or there is an association mapping relationship between the encrypted identifier and the permanent identifier of the user equipment, or the like. In a word, the user plane message sent by the user equipment to the application function device carries the encrypted identifier instead of the permanent identifier of the user equipment. This can effectively reduce a risk of leaking the permanent identifier of the user equipment to reduce a risk of exposing user privacy.

In a possible implementation, the encrypted identifier may be a subscription concealed identifier (SUCI), a generic public subscription identifier (GPSI), an AKMA-key identifier (A-KID), or the like of the user equipment. The permanent identifier of the user equipment may be a subscription permanent identifier (SUPI).

In a possible implementation, the user plane message is a discovery request in a proximity-based service (ProSe) procedure.

In a possible implementation, the method further includes: The user equipment determines to use a procedure with privacy protection. The procedure with privacy protection is used for interaction between the user equipment and the application function device.

In this application, the user equipment selects the procedure with privacy protection, to further improve security of information exchanged between the user equipment and the application function device.

In a possible implementation, the procedure with privacy protection includes an authentication and key management for applications AKMA procedure.

In a possible implementation, that the user equipment determines to use a procedure with privacy protection includes: the user equipment determines to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

This application provides a plurality of methods for selecting a procedure with privacy protection, so that the procedure with privacy protection can be selected as much as possible, to improve security of the information exchanged between the user equipment and the application function device, and reduce a risk of leaking the permanent identifier of the user equipment.

In a possible implementation, the method further includes: the user equipment receives encryption algorithm information from the application function device; and the case in which the confidentiality protection is inactivated includes a case in which the encryption algorithm information indicates that an encryption algorithm is a null algorithm.

In this application, the user equipment can negotiate, with the application function device, an encryption algorithm used to protect the information exchanged between the user equipment and the application function device. When the UE determines that the negotiated encryption algorithm is the null algorithm, the user plane message sent by the user equipment carries the encrypted identifier, to reduce a risk of leaking the permanent identifier of the user equipment.

According to a second aspect, this application provides a secure communication method. The method includes: the user equipment determines to use a procedure with privacy protection, where the procedure with privacy protection is used for interaction between the user equipment and an application function device; the user equipment determines, based on the procedure with privacy protection, a communication key for interaction with the application function device and a non-null encryption algorithm; and the user equipment sends a user plane message to the application function device, where the user plane message includes an identifier of the user equipment, and confidentiality protection is performed on the user plane message by using the communication key and the non-null encryption algorithm.

In this application, the user equipment determines to use the procedure with privacy protection, and negotiates, in the procedure, with the application function device, to use the non-null encryption algorithm to protect information exchanged between the two devices. This reduces a risk of leaking a permanent identifier of the user equipment.

In a possible implementation, because the confidentiality protection is performed on the information exchanged between the user equipment and the application function device by using a non-encryption algorithm, the identifier of the user equipment that is carried in the user plane message may be an encrypted identifier of the user equipment, or may be the permanent identifier of the user equipment.

In a possible implementation, that the user equipment determines to use a procedure with privacy protection includes: the user equipment determines to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

This application provides a plurality of methods for selecting a procedure with privacy protection, so that the procedure with privacy protection can be selected as much as possible, to improve security of the information exchanged between the user equipment and the application function device, and reduce a risk of leaking the permanent identifier of the user equipment.

In a possible implementation, that the user equipment determines, based on the procedure with privacy protection, a communication key for interaction with the application function device and an encryption algorithm includes: the user equipment generates the communication key based on an anchor key stored in the user equipment;

the user equipment sends a request message to the application function device, where the request message includes a key identifier and information indicating to use the procedure with privacy protection, and the key identifier is used to assist the application function device in obtaining the communication key; and the user equipment receives a response message from the application function device, where the response message includes information about the non-null encryption algorithm.

In this application, the request message may be a key agreement request message between the user equipment and the application function device, and the application function device obtains the communication key based on the key identifier in the message after receiving the message. Alternatively, the message may be considered as an indication message for selecting a non-null encryption algorithm. The application function device selects a non-null encryption algorithm based on the message, carries information such as an identifier of the non-null encryption algorithm in the response message, and sends the response message to the user equipment. In this way, key agreement and non-null encryption algorithm negotiation are completed.

In a possible implementation, the request message further includes indication information for negotiating the non-null encryption algorithm.

In this application, the indication information for negotiating the non-null encryption algorithm may be carried in the key agreement request to explicitly indicate the application function device to select a non-null encryption algorithm, to ensure effective confidentiality protection for subsequent interaction information.

In a possible implementation, the request message further includes information about an encryption algorithm supported by the user equipment. The information about the encryption algorithm supported by the user equipment indicates the application function device to select a non-null encryption algorithm. The encryption algorithm supported by the user equipment is a non-null encryption algorithm.

In this application, the request message sent by the user equipment to the application function device carries information about a non-null encryption algorithm supported by the user equipment, for example, an identifier of the non-null encryption algorithm. When the application function device selects, based on the request message, an encryption algorithm set supported by the application function device, and an encryption algorithm set supported by the user equipment, an encryption algorithm supported by both the application function device and the user equipment, the application function device does not select a null encryption algorithm. This ensures encryption protection on communication information between the user equipment and the application function device.

According to a third aspect, this application provides a secure communication method. The method includes: user equipment determines to use a procedure with privacy protection, where the procedure with privacy protection is used for interaction between the user equipment and an application function device; the user equipment determines, based on the procedure with privacy protection, a communication key for interaction with the application function device; and the user equipment sends a user plane message to the application function device, where the user plane message includes an encrypted identifier of the user equipment, and confidentiality protection is performed on the user plane message by using the communication key.

In this application, the user equipment determines to select the procedure with privacy protection to implement interaction with an application function, and the encrypted identifier of the user equipment may be used in the procedure with privacy protection. Therefore, when the user equipment sends the user plane message to the application function device, an identifier of the user equipment that is included in the user plane message is the encrypted identifier of the user equipment. This reduces a risk of leaking a permanent identifier of the user equipment. Compared with the foregoing solution, in this application, there is no need to negotiate use of a non-null encryption algorithm, and determine whether the confidentiality protection is activated. This reduces usage of a resource of the user equipment and/or the application function device, reduces amount of information exchanged between the user equipment and the application function device, and further reduces usage of a bandwidth resource.

In a possible implementation, that user equipment determines to use a procedure with privacy protection includes: the user equipment determines to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

This application provides a plurality of methods for selecting a procedure with privacy protection, so that the procedure with privacy protection can be selected as much as possible, to improve security of the information exchanged between the user equipment and the application function device, and reduce the risk of leaking the permanent identifier of the user equipment.

According to a fourth aspect, this application provides a secure communication method. The method includes: an application function device receives a user plane message from user equipment, where the user plane message includes an encrypted identifier of the user equipment, and the user plane message is used to request to initiate a target procedure; and the application function device checks, based on the encrypted identifier, whether the user equipment is authorized to participate in the target procedure.

In this application, the user plane message carries the encrypted identifier of the user equipment, so that a risk of leaking a permanent identifier of the user equipment can be effectively reduced. In view of this, in this application, whether the user equipment is authorized to participate in the target procedure may be further checked based on the encrypted identifier of the user equipment.

In a possible implementation, the user plane message is a discovery request in a proximity-based service ProSe procedure. Then, checking whether the user equipment is authorized to participate in the target procedure may be checking whether the user equipment is authorized to participate in a ProSe procedure, that is, checking whether the user equipment is authorized to communicate with a neighboring device.

In a possible implementation, that the application function device checks, based on the encrypted identifier, whether the user equipment is authorized to participate in the target procedure includes: the application function device sends a first authorization check request to a unified data management device, where the first authorization check request includes the encrypted identifier; and the application function device receives a first authorization check response from the unified data management device, where the first authorization check response is used to indicate whether the user equipment is authorized to participate in the target procedure, the first authorization check response is obtained based on the permanent identifier of the user equipment, and the permanent identifier is obtained by processing the encrypted identifier.

In this application, even if an authorization check request carries the encrypted identifier, the unified data management device can obtain the permanent identifier of the user equipment based on the encrypted identifier, to complete authorization check.

In a possible implementation, the first authorization check response may include the permanent identifier of the user equipment.

In this application, the unified data management device carries the obtained permanent identifier of the user equipment in an authorization check response and feeds back the authorization check response to the application function device, so that the application function device can obtain another parameter, such as QoS information, of the user equipment during subsequent interaction with another core network element.

In a possible implementation, that the application function device checks, based on the encrypted identifier, whether the user equipment is authorized to participate in the target procedure includes: the application function device obtains the permanent identifier of the user equipment based on the encrypted identifier; the application function device sends a second authorization check request to the unified data management device, where the second authorization check request includes the permanent identifier; and the application function device receives the second authorization check response from the unified data management device, where the second authorization check response is used to indicate whether the user equipment is authorized to participate in the target procedure, and the first authorization check response is obtained based on the permanent identifier.

In this application, the application function device can obtain the permanent identifier of the user equipment based on the encrypted identifier, to further check an authorization status of the user equipment.

In a possible implementation, the encrypted identifier includes a key identifier. Before the application function device obtains the permanent identifier of the user equipment based on the encrypted identifier, the method further includes: the application function device receives a permanent identifier from an application security anchor function device, receives a key identifier from the user equipment, and stores the permanent identifier and the key identifier in association.

In this application, the application function device can store a mapping relationship between the permanent identifier and the key identifier of the user equipment in advance, so that the permanent identifier of the user equipment can be obtained when the received user plane message carries the key identifier, to further check the authorization status of the user equipment.

In a possible implementation, the encrypted identifier includes a generic public subscription identifier of the user equipment. Before the application function device obtains the permanent identifier of the user equipment based on the encrypted identifier, the method further includes: the application function device receives a generic public subscription identifier and the permanent identifier from the application security anchor function device, and stores the generic public subscription identifier and the permanent identifier in association.

In this application, the application function device can store a mapping relationship between the permanent identifier and the generic public subscription identifier of the user equipment in advance, so that the permanent identifier of the user equipment can be obtained when the received user plane message carries the generic public subscription identifier of the user equipment, to further check the authorization status of the user equipment.

According to a fifth aspect, this application provides a communication method. The method includes: a unified data management device receives a first authorization check request from an application function device, where the first authorization check request includes an encrypted identifier; the unified data management device obtains a permanent identifier of user equipment based on the encrypted identifier, and checks, based on the permanent identifier, whether the user equipment is authorized to participate in a target procedure; and the unified data management device sends a first authorization check response to the application function device, where the first authorization check response is used to indicate whether the user equipment is authorized to participate in the target procedure.

In this application, even if an authorization check request carries the encrypted identifier, the unified data management device can obtain the permanent identifier of the user equipment based on the encrypted identifier, to complete authorization check.

In a possible implementation, the encrypted identifier is a concealed identifier of the user equipment. The unified data management device is specifically configured to obtain the permanent identifier of the user equipment based on the concealed identifier.

Alternatively, the encrypted identifier is a generic public subscription identifier of the user equipment. The unified data management device is specifically configured to locally search for the permanent identifier of the user equipment based on the generic public subscription identifier.

Alternatively, the encrypted identifier is a key identifier. The key identifier is used to identify a key of the user equipment. The unified data management device is specifically configured to locally search for the permanent identifier of the user equipment based on the key identifier.

In a possible implementation, when the encrypted identifier is the key identifier, before the unified data management device locally searches for the permanent identifier of the user equipment based on the key identifier, the method further includes: the unified data management device receives a key identifier from the authentication server function device, and stores the key identifier and the permanent identifier of the user equipment in association.

In this application, the unified data management device can store a mapping relationship between the key identifier and the permanent identifier of the user equipment in advance, so that the permanent identifier of the user equipment can be obtained when the received authorization check request carries the key identifier, to further check an authorization status of the user equipment.

According to a sixth aspect, this application provides user equipment. The user equipment includes: a first determining unit, configured to determine whether confidentiality protection is activated for communication data between the user equipment and an application function device; and a sending unit, configured to send a user plane message to the application function device, where the user plane message includes an identifier of the user equipment, and the identifier is an encrypted identifier in a case in which the confidentiality protection is inactivated.

In a possible implementation, the user equipment further includes: a second determining unit, configured to determine to use a procedure with privacy protection, where the procedure with privacy protection is used for interaction between the user equipment and the application function device.

In a possible implementation, the procedure with privacy protection includes an authentication and key management for applications AKMA procedure.

In a possible implementation, the second determining unit is specifically configured to: determine to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

In a possible implementation, the user equipment further includes: a receiving unit, configured to receive encryption algorithm information from the application function device; and the case in which the confidentiality protection is inactivated includes: a case in which the encryption algorithm information indicates that an encryption algorithm is a null algorithm.

In a possible implementation, the encrypted identifier is a subscription concealed identifier SUCI, a generic public subscription identifier GPSI, or an AKMA-key identifier A-KID.

In a possible implementation, the user plane message is a discovery request in a proximity-based service ProSe procedure.

According to a seventh aspect, this application provides user equipment. The user equipment includes: a first determining unit, configured to determine to use a procedure with privacy protection, where the procedure with privacy protection is used for interaction between the user equipment and an application function device; a second determining unit, configured to determine, based on the procedure with privacy protection, a communication key for interaction with the application function device and a non-null encryption algorithm; and a sending unit, configured to send a user plane message to the application function device, where the user plane message includes an identifier of the user equipment, and confidentiality protection is performed on the user plane message by using the communication key and the non-null encryption algorithm.

In a possible implementation, the first determining unit is specifically configured to: determine to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

In a possible implementation, the second determining unit is specifically configured to: generate the communication key based on an anchor key stored in the second determining unit; send a request message to the application function device, where the request message includes a key identifier and information indicating to use the procedure with privacy protection, and the key identifier is used to assist the application function device in obtaining the communication key; and receive a response message from the application function device, where the response message includes information about the non-null encryption algorithm.

In a possible implementation, the request message further includes indication information for negotiating the non-null encryption algorithm.

In a possible implementation, the request message further includes information about an encryption algorithm supported by the user equipment. The information about the encryption algorithm supported by the user equipment indicates the application function device to select a non-null encryption algorithm. The encryption algorithm supported by the user equipment is a non-null encryption algorithm.

According to an eighth aspect, this application provides user equipment. The user equipment includes: a first determining unit, configured to determine to use a procedure with privacy protection, where the procedure with privacy protection is used for interaction between the user equipment and an application function device; a second determining unit, configured to determine, based on the procedure with privacy protection, a communication key for interaction with the application function device; and a sending unit, configured to send a user plane message to the application function device, where the user plane message includes an encrypted identifier of the user equipment, and confidentiality protection is performed on the user plane message by using the communication key.

In a possible implementation, the procedure with privacy protection includes an authentication and key management for applications AKMA procedure.

In a possible implementation, the first determining unit is specifically configured to determine to use the procedure with privacy protection when one or more of the following conditions are met: an application started by the user equipment indicates the user equipment to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the user equipment receives an indication of preferably selecting the procedure with privacy protection; the user equipment determines that the user equipment uses a 5G universal subscriber identity module; the user equipment determines that the user equipment has a valid public key and a valid private key; or the user equipment determines that the user plane message needs to carry a permanent identifier of the user equipment.

According to a ninth aspect, this application provides a communication apparatus. The communication apparatus may be user equipment, or may be an apparatus in the user equipment, for example, a chip system. In a design, the apparatus may include a corresponding module for performing the method/operation/step/action described in the first aspect, the second aspect, or the third aspect, and various possible implementations. The module may be a hardware circuit, or may be software, or may be implemented by a combination of the hardware circuit and the software. In a design, the apparatus may include a processing module and a transceiver module.

In the method according to the first aspect, for example, the processing module is configured to determine whether confidentiality protection is activated for communication data between the communication apparatus and an application function device.

The transceiver module is configured to send a user plane message to the application function device, where the user plane message includes an identifier of the user equipment, and the identifier is an encrypted identifier in a case in which the confidentiality protection is inactivated.

In the method according to the second aspect, for example, the processing module is configured to: determine to use a procedure with privacy protection, where the procedure with privacy protection is used for interaction between the user equipment and an application function device; and determine, based on the procedure with privacy protection, a communication key for interaction with the application function device and a non-null encryption algorithm.

The transceiver module is configured to send a user plane message to the application function device, where the user plane message includes an identifier of the user equipment, and confidentiality protection is performed on the user plane message by using the communication key and the non-null encryption algorithm.

In the method according to the third aspect, for example, the processing module is configured to: determine to use a procedure with privacy protection, where the procedure with privacy protection is used for interaction between the user equipment and an application function device; and determine, based on the procedure with privacy protection, a communication key for interaction with the application function device.

The transceiver module is configured to send a user plane message to the application function device, where the user plane message includes an encrypted identifier of the user equipment, and confidentiality protection is performed on the user plane message by using the communication key.

According to a tenth aspect, this application provides a communication apparatus. The communication apparatus may be an application function device, or may be an apparatus in the application function device, for example, a chip system. In a design, the apparatus may include a corresponding module for performing the method/operation/step/action described in the fourth aspect and various possible implementations. The module may be a hardware circuit, or may be software, or may be implemented by a combination of the hardware circuit and the software. In a design, the apparatus may include a processing module and a transceiver module.

For example, the processing module is configured to: receive a user plane message from the user equipment by using the transceiver module, where the user plane message includes an encrypted identifier of the user equipment, and the user plane message is used to request to initiate a target procedure; and check, based on the encrypted identifier, whether the user equipment is authorized to participate in the target procedure.

According to an eleventh aspect, this application provides a communication apparatus. The communication apparatus may be a unified data management device, or may be an apparatus in the unified data management device, for example, a chip system. In a design, the apparatus may include a corresponding module for performing the method/operation/step/action described in the fourth aspect and various possible implementations. The module may be a hardware circuit, or may be software, or may be implemented by a combination of the hardware circuit and the software. In a design, the apparatus may include a processing module and a transceiver module.

For example, the processing module is configured to: receive a first authorization check request from an application function device by using the transceiver module, where the first authorization check request includes an encrypted identifier; obtain a permanent identifier of user equipment based on the encrypted identifier, and check, based on the permanent identifier, whether the user equipment is authorized to participate in a target procedure; and send a first authorization check response to the application function device by using the transceiver module, where the first authorization check response is used to indicate whether the user equipment is authorized to participate in the target procedure.

According to a twelfth aspect, this application provides a communication apparatus. The apparatus may be user equipment or may be an apparatus in the user equipment. The communication apparatus includes a processor, configured to implement the method according to the first aspect, the second aspect, or the third aspect. The apparatus may further include a memory, configured to store instructions and data. The memory is coupled to the processor. When the processor executes the instructions stored in the memory, the apparatus is enabled to implement the method according to any one of the first aspect or the possible implementations of the first aspect, any one of the second aspect or the possible implementations of the second aspect, or any one of the third aspect or the possible implementations of the third aspect. The apparatus may further include a communication interface. The communication interface is used by the apparatus to communicate with another device. For example, the communication interface may be a circuit hardware module such as a transceiver or a bus, and the another device may be an application function device.

For example, in the method according to the first aspect, in a possible design, the apparatus includes: the memory, configured to store program instructions; and the processor, configured to: determine whether confidentiality protection is activated for communication data between the processor and the application function device; and send a user plane message to the application function device through the communication interface, where the user plane message includes an identifier of the user equipment, and the identifier is an encrypted identifier in a case in which the confidentiality protection is inactivated.

For example, in the method according to the second aspect, in a possible design, the apparatus includes: the memory, configured to store program instructions; and the processor, configured to: determine to use a procedure with privacy protection, where the procedure with privacy protection is used for interaction between the user equipment and the application function device; determine, based on the procedure with privacy protection, a communication key for interaction with the application function device and a non-null encryption algorithm; and send a user plane message to the application function device through the communication interface, where the user plane message includes an identifier of the user equipment, and confidentiality protection is performed on the user plane message by using the communication key and the non-null encryption algorithm.

For example, in the method according to the third aspect, in a possible design, the apparatus includes: the memory, configured to store program instructions; and the processor, configured to: determine to use a procedure with privacy protection, where the procedure with privacy protection is used for interaction between the user equipment and the application function device; determine, based on the procedure with privacy protection, a communication key for interaction with the application function device; and send a user plane message to the application function device through the communication interface, where the user plane message includes an encrypted identifier of the user equipment, and confidentiality protection is performed on the user plane message by using the communication key.

According to a thirteenth aspect, this application provides a communication apparatus. The apparatus may be an application function device or may be an apparatus in the application function device. The communication apparatus includes a processor, configured to implement the method according to the fourth aspect. The apparatus may further include a memory, configured to store instructions and data. The memory is coupled to the processor. When the processor executes the instructions stored in the memory, the apparatus is enabled to implement the method according to any one of the fourth aspect or the possible implementations of the fourth aspect. The apparatus may further include a communication interface. The communication interface is used by the apparatus to communicate with another device. For example, the communication interface may be a circuit hardware module such as a transceiver or a bus, and the another device may be user equipment.

In a possible design, the apparatus includes: the memory, configured to store program instructions; and the processor, configured to: receive a user plane message from the user equipment through the communication interface, where the user plane message includes an encrypted identifier of the user equipment, and the user plane message is used to request to initiate a target procedure; and check, based on the encrypted identifier, whether the user equipment is authorized to participate in the target procedure.

According to a fourteenth aspect, this application provides a communication apparatus. The apparatus may be a unified data management device or may be an apparatus in the unified data management device. The communication apparatus includes a processor, configured to implement the method according to the fifth aspect. The apparatus may further include a memory, configured to store instructions and data. The memory is coupled to the processor. When the processor executes the instructions stored in the memory, the apparatus is enabled to implement the method according to any one of the fourth aspect or the possible implementations of the fourth aspect. The apparatus may further include a communication interface. The communication interface is used by the apparatus to communicate with another device. For example, the communication interface may be a circuit hardware module such as a transceiver or a bus, and the another device may be an application function device.

In a possible design, the apparatus includes: the memory, configured to store program instructions; and the processor, configured to: receive a first authorization check request from the application function device through the communication interface, where the first authorization check request includes an encrypted identifier; obtain a permanent identifier of user equipment based on the encrypted identifier, and check, based on the permanent identifier, whether the user equipment is authorized to participate in a target procedure; and send a first authorization check response to the application function device through the communication interface, where the first authorization check response is used to indicate whether the user equipment is authorized to participate in the target procedure.

According to a fifteenth aspect, this application provides a computer-readable storage medium. The computer-readable storage medium stores a computer program. When the computer program is executed, a computer is enabled to perform the method according to any implementation of the first aspect; or when the computer program is executed, a computer is enabled to perform the method according to any implementation of the second aspect; or when the computer program is executed, a computer is enabled to perform the method according to any implementation of the third aspect; or when the computer program is executed, a computer is enabled to perform the method according to any implementation of the fourth aspect; or when the computer program is executed, a computer is enabled to perform the method according to any implementation of the fifth aspect.

The solutions provided in the sixth aspect to the fifteenth aspect are used to implement or cooperate to implement the methods provided in the first aspect to the fifth aspect, and therefore can achieve beneficial effect the same as or corresponding to that in the first aspect to the fifth aspect. Details are not described herein again.

In conclusion, a risk of leaking the permanent identifier of the user equipment during interaction between the user equipment and the another device can be reduced, to reduce the risk of exposing user privacy.

DETAILED DESCRIPTION OF ILLUSTRATIVE EMBODIMENTS

Figure 1:
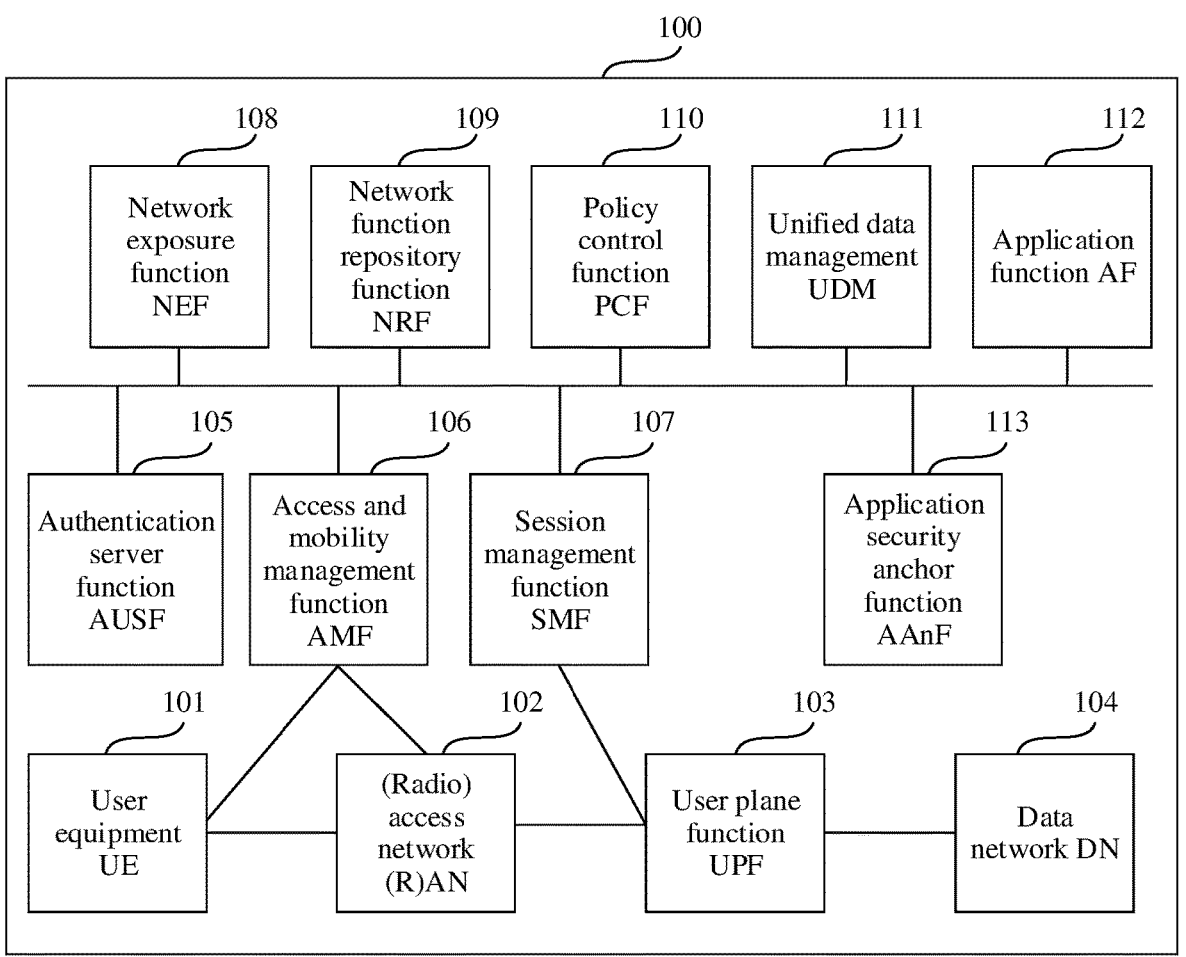
FIG. 1 is a schematic diagram of a system architecture used in a secure communication method according to an embodiment of this application.

To better understand the technical solutions provided in embodiments of this application, the technical terms in embodiments of this application are first described.

1. Confidentiality Protection

The confidentiality protection means protecting confidentiality of information (the information may include control plane signaling, user plane data, and the like) during transmission, and may also be referred to as encryption protection. The confidentiality means that actual content cannot be directly seen. The confidentiality protection in this application is non-null confidentiality protection, that is, a used encryption algorithm is a non-null encryption algorithm.

2. Integrity Protection

The integrity protection means protecting integrity of information (the information may include control plane signaling, user plane data, and the like) during transmission. The integrity means that the information is consistent with original information and is not modified.

3. Encryption Algorithm

The encryption algorithm is used to encrypt information (the information may include control plane signaling, user plane data, and the like) during transmission. The encryption algorithm includes a null encryption algorithm and a non-null encryption algorithm. The null encryption algorithm does not substantially encrypt the information, in other words, the information is not encrypted. The non-null encryption algorithm can encrypt the information and protect confidentiality of the information. For example, the non-null encryption algorithm may include a Hash algorithm, an MD5 algorithm, or the like.

4. Integrity Protection Algorithm

The integrity protection algorithm is used to protect integrity of data during transmission and prevent the data from being tampered with. The integrity protection algorithm may be the same as an encryption algorithm, for example, may be a Hash algorithm or an MD5 algorithm. The integrity protection algorithm may alternatively be different from an encryption algorithm, for example, may be another algorithm: an international data encryption algorithm (IDEA), a symmetric algorithm data encryption standard (DES), or the like.

5. Transport Layer Security (TLS) Protocol

The TLS protocol is used to provide confidentiality protection and data integrity protection between two communication applications. The protocol includes two layers: a TLS record protocol and a TLS handshake protocol.

The TLS record protocol is a layered protocol. Information in each layer may include fields such as a length, description, and content. The record protocol supports information transmission, segmentation of data into blocks that can be processed, data compression, encryption, and result transmission. The received data is decrypted, checked, decompressed, and reassembled, and then transferred to a higher-level client.

The TLS handshake protocol includes three sub-protocol suites, and allows peer parties to agree on a record-layer security parameter, perform self-authentication, instantiate and negotiate a security parameter, and report an error condition to each other. Connection security provided in the TLS handshake protocol has three basic attributes.

1. Asymmetric or public-key cryptography may be used to authenticate an identity of the peer party.

2. Agreement of a shared cipher key is secure. Agreement and encryption are difficult for an eavesdropper to obtain. In addition, for any authenticated connection, encryption cannot be obtained, even by an attacker who can place himself in the middle of the connection.

3. The agreement is reliable. No attacker can modify negotiation communication without being detected by the parties to the communication.

To better understand a secure communication method, a device, a system, and a computer-readable storage medium provided in embodiments of this application, the following first describes an example of a system architecture of the secure communication method to which embodiments of this application are applicable. FIG. 1 shows a system architecture 100. The system architecture 100 is a current 5G network architecture, and may include user equipment (UE) 101, a (radio) access network ((R)AN) 102, and a user plane function (user plane function, UPF) 103, a data network (DN) 104, an authentication server function (AUSF) 105, an access and mobility management function (AMF) 106, a session management function (SMF) 107, a network exposure function (NEF) 108, a network function repository function (NRF) 109, a policy control function (PCF) no, a unified data management (UDM) 111, an application function (AF) 112, and an application security anchor function (AAnF) 113. These functions may be an independent network element device in the 5G network architecture, or may be a function implementation in the network element device in the 5G network architecture, or the like. Functions of 105 to 113 are network elements or functions in a 5G core network.

The user equipment UE 101 may include an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, a terminal device in a future evolved public land mobile network (PLMN), or the like. This is not limited in this embodiment of this application.

The (R)AN 102 may be a third generation partnership project (3GPP) access network, for example, long term evolution (LTE), or 5G new radio (NR). Alternatively, the (R)AN 102 may be a non-third generation partnership project non-3GPP access network (for example, common Wi-Fi access). If the most common mobile phone internet access is used as an example, the (radio) access network (R)AN 102 may be a base station.

The user plane function UPF 103 is mainly responsible for data packet routing and forwarding and quality of service (QoS) flow mapping. The UPF 103 is similar to a gateway of a 4G network.

The data network DN 104 includes a carrier service, internet access, or a third-party service, and is similar to a 4G external data network.

The authentication server function AUSF 105 is a functional entity used by a network to authenticate UE. The authentication server function is used to verify whether the UE is real, and may support access service authentication defined in a 3GPP framework and authentication of a non-3GPP access network.

The access and mobility management function AMF 106 is used to manage access and mobility. This function is the most important function in an overall 5G core network architecture, and is generally similar to a mobility management logical function in a 4G mobility management entity (MME) function. This function is used to process a network control plane message. Specific functions include access network control plane processing, non-access stratum (NAS) message processing, NAS message encryption and integrity protection, registration management, connection management, accessibility management, mobility management, interception of legitimate information, provision of some special session management messages for the session management function SMF, access authentication and authorization, a security anchor function (SEAF) (the SEAF may be considered as an authentication proxy of the authentication server function AUSF), location service management, allocation of an EPS bearer ID during interaction with an evolved packet system (EPS) of a 4G core network, notification of a UE movement event, optimization of control plane data transmission in a 5G internet of things, and provision of an external configuration parameter.

The session management function SMF 107 may be used to allocate a session resource to a user plane.

The network exposure function NEF 108 is an interface used by the 5G core network to exchange a related capability and information with an external system. Network capabilities that may be provided for the external system through the interface mainly include a monitoring capability, a supply capability, a policy/charging capability, and an analysis report capability.

The network function repository function NRF 109 may support a service discovery function. A network element "discovery" request is received from a network element function or service communication proxy, and information about the "discovered" network element function may be fed back.

The policy control function PCF 110 supports a unified policy framework for controlling network behavior, provides a policy rule for a control plane for execution, and accesses subscription information related to policy formulation in a UDR.

The unified data management UDM 111 may be used for authentication credit processing and processing of a user identifier; may implement storage and management of a subscription permanent identifier (SUPI), and support anonymization of a subscription concealed identifier (SUCI); provide access authorization based on subscription data; perform registration management on a function of a network element that provides a service for the UE; maintain service/session continuity by allocating an SMF/data network name (DNN) to a session; be used for subscription management; receive and manage a called short message; intercept legal information; be used for 5G local area network user management; and support an external parameter.

The application function AF 112 interacts with the 5G core network to provide a service, for example, support the following functions: impact on an application of a service route, exposure of a network access capability, and interaction with a policy framework to perform policy control. Based on a deployment policy of a carrier, the trusted AF can directly access an internal network element function of the 5G core network to improve service processing efficiency. Certainly, the trusted AF can alternatively use a common external network element function access framework to exchange information based on the NEF and a corresponding internal network element function.

The application security anchor function AAnF 113 is mainly used to cooperate to complete authentication and establish a shared key for communication between the UE and a core network.

It should be noted that the system architecture 100 described in FIG. 1 is a non-roaming 5G system architecture reference model, and uses a service-based representation, which is also referred to as a service-based architecture (SBA). The 5G network may further be an architecture mode or the like based on a representation of a reference point, or may be a network architecture to which the secure communication method provided in this application is applicable.

Based on the system architecture described above, in a device-to-device (D2D) communication scenario, before two user equipments UEs communicate with each other, the core network needs to be used to assist the two UEs in discovering each other. Specifically, it is assumed that the two UEs are referred to as a first UE and a second UE. In this case, the first UE and the second UE need to perform mutual identity authentication with the core network and generate a shared key to ensure secure communication, and then the first UE and the second UE separately send a discovery request to the core network. The core network triggers a discovery procedure of the first UE and the second UE based on the discovery request. The discovery procedure is an existing technical solution. Details are not described herein in this application.

In addition, it should be noted that there may be another communication scenario in addition to the foregoing DD communication scenario. Before specific user plane data exchange is implemented, the UEs and the core network need to perform mutual identity authentication and generate the shared key. A specific application communication scenario is not limited in this application.

Figure 2:
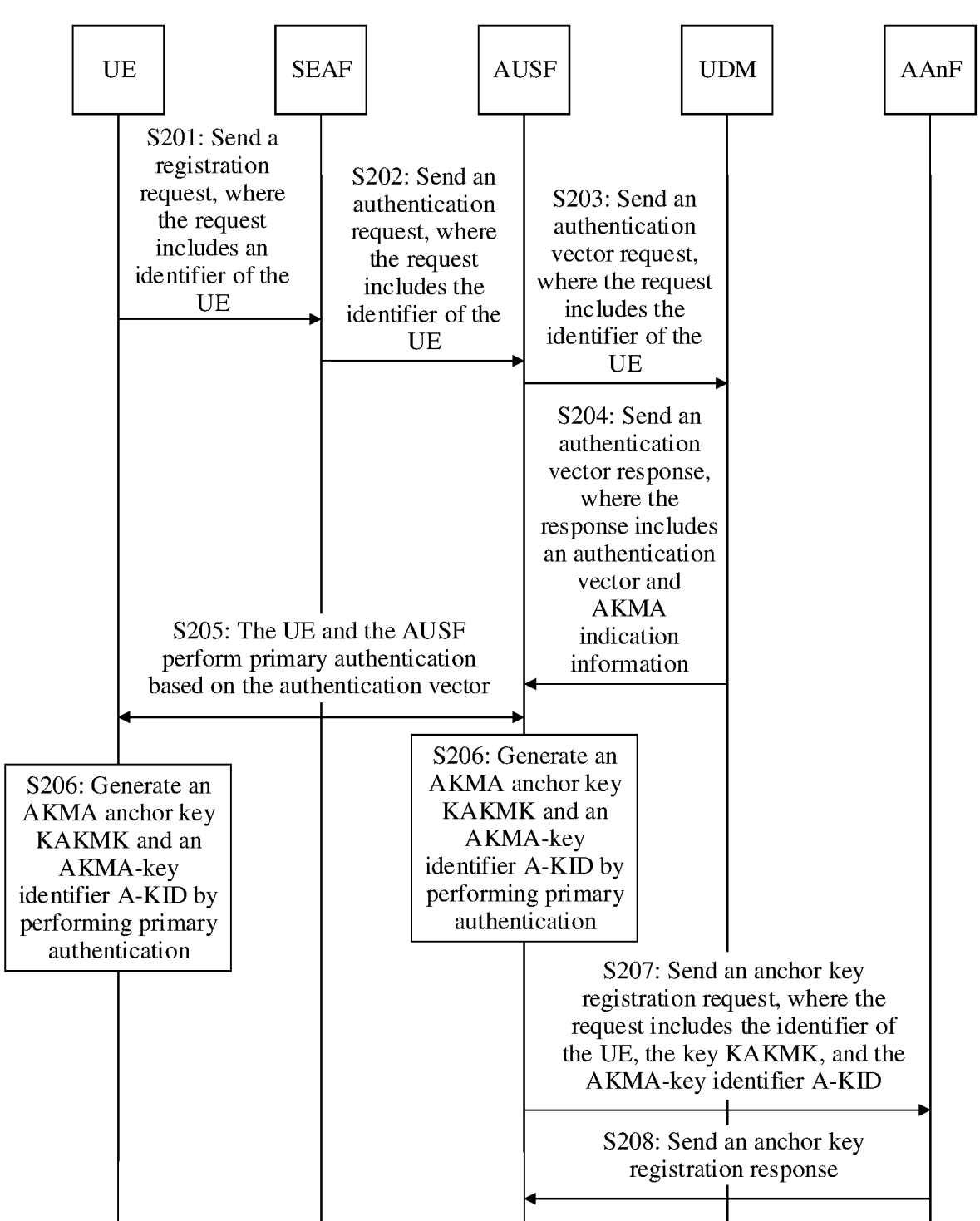
FIG. 2 and FIG. 3 are schematic flowcharts of performing identity authentication between user equipment and a core network.

Identity authentication and shared key generation between the UEs and the core network may be specifically authentication and generation between the UEs and a core network element. For ease of understanding, refer to FIG. 2 first. FIG. 2 shows an example of a procedure of performing identity authentication and shared key generation between the UEs and the core network element. FIG. 2 is described by using an authentication and key management for applications (AKMA) technology in the 5G network as an example.

It can be learned from FIG. 2 that authentication and shared key generation between the UE and the core network need to be completed through interaction between the user equipment UE, the security anchor function SEAF, the authentication server function AUSF, the unified data management UDM, and the application security anchor function AAnF. A specific interaction process may include the following steps.

S201: The user equipment UE sends a registration request to the security anchor function SEAF. The registration request includes an identifier of the UE.

The identifier of the UE may be a SUCI of the UE or a 5G global unique temporary identity (5G-GUTI). When the UE locally stores the 5G-GUTI, the UE carries the 5G-GUTI in the registration request. When the UE does not locally store the 5G-GUTI, the UE carries the SUCI in a registration request message. The SUCI may be understood as an encryption form of the SUPI. For example, refer to descriptions in section 6.12.2 of 3GPP TS33.501 and section 2.2B of TS 23.003. Specifically, the SUCI may include a route identifier and an encrypted part. The encrypted part is encrypted subscriber identity information. In a possible implementation, a part other than a mobile country code (MCC) in the SUPI may be obtained by performing encryption calculation by using a universal subscriber identity module (USIM) or a mobile equipment (ME).

S202: The security anchor function SEAF sends an authentication request to the authentication server function AUSF. The authentication request includes the identifier of the UE.

If the UE carries the 5G-GUI in a registration request message, the SEAF determines the SUPI based on the 5G-GUTI, and then carries the SUPI in an authentication request message. If the UE carries the SUCI in the registration request message, the SEAF directly places the SUCI in the authentication request message. The authentication request message may be an Nausf_UEAuthentication_Authenticate Request message. Because the SEAF is a function in the access and mobility management function AMF, the authentication request may be sent by the AMF to the AUSF.

S203: The authentication server function AUSF sends an authentication vector request to the unified data management UDM. The authentication vector request includes the identifier of the UE.

If the AUSF receives the SUPI from the SEAF, the authentication vector request includes the SUPI. If the AUSF receives the SUCI from the SEAF, the authentication vector request includes the SUCI.

The authentication vector request is used to request an authentication vector from the UDM. The authentication vector is used to trigger primary authentication (primary authentication) between the core network and the UE.

S204: The unified data management UDM sends an authentication vector response to the authentication server function AUSF. The response includes the authentication vector and AKMA indication information.

If a UE identifier carried in the authentication vector request received by the UDM is the SUCI, the UDM decrypts the SUCI to obtain the SUPI, carries the SUPI in the authentication vector response, and sends the response to the AUSF.

The UDM may determine, based on the identifier of the UE and subscription information, whether the UE supports an AKMA service. If the UE supports the AKMA service, the UDM transmits the AKMA indication information to the AUSF, to notify the AUSF that the UE can support the AKMA service.

S205: The user equipment UE and the authentication server function AUSF perform primary authentication based on the authentication vector.

For a primary authentication procedure, refer to related descriptions in Chapter 6 in the standard TS 33.501. Details are not described herein again.

During primary authentication, the UE and the AUSF may separately obtain an AUSF key $K_{AUSF}$. In addition, when the authentication vector response received by the AUSF from the UDM includes the AKMA indication information, the AUSF stores the AUSF key $K_{AUSF}$.

After primary authentication between the UE and the AUSF is completed, it indicates that identity authentication between the UE and the AUSF is completed, that is, identity authentication between the UE and the core network is completed.

S206: The user equipment UE and the authentication server function AUSF separately generate an AKMA anchor key $K_{AKMK}$ and an AKMA-key identifier (A-KID) by performing primary authentication.

Specifically, after the UE and the AUSF complete primary authentication, the UE and the AUSF separately generate the AKMA anchor key $K_{AKMA}$ and the AKMA-key identifier (A-KID) based on a preconfigured protocol, a same algorithm, and $K_{AUSF}$. The A-KID is used to identify the key $K_{AKMA}$, and the key $K_{AKMA}$ is used to subsequently derive a shared key Kai for protecting a communication channel between the UE and the application function AF.

A format of the A-KID is username@example. Herein, username includes a routing identifier (RID) and an AKMA temporary UE identifier (A-TID). The RID is a part of the SUCI and is represented by 1 to 4 decimal digits. The A-TID is a temporary identifier generated based on $K_{AUSF}$, and $K_{AUSF}$ is a key generated by the AUSF during primary authentication. In addition, example includes a home network identifier.

S207: The authentication server function AUSF sends an anchor key registration request to the application security anchor function AAnF. The anchor key registration request includes the SUPI, the key $K_{AKMK}$, and the AKMA-key identifier A-KID that are of the UE.

S208: The application security anchor function AAnF sends an anchor key registration response to the authentication server function AUSF.

In step 207 and step 208, the SUPI, the key $K_{AKMK}$, and the AKMA-key identifier A-KID that are of the UE may be registered and stored in the application security anchor function AAnF in association, so that the shared key is generated between the UE and the core network.

The foregoing describes the procedure of performing identity authentication and shared key generation between the UE and the core network by using the AKMA technology as an example. In a possible implementation, in a 5G network, a generic bootstrapping architecture (generic bootstrapping architecture, GBA) technology may alternatively be used to implement the procedure of performing shared key generation between the UE and the core network. In the existing technical solution, the GBA technology is generally used in a 4G network. Currently, the GBA technology is applied to a 5G network, which may be referred to as a 5G GBA technology. For ease of understanding, refer to FIG. 3.

Figure 3:
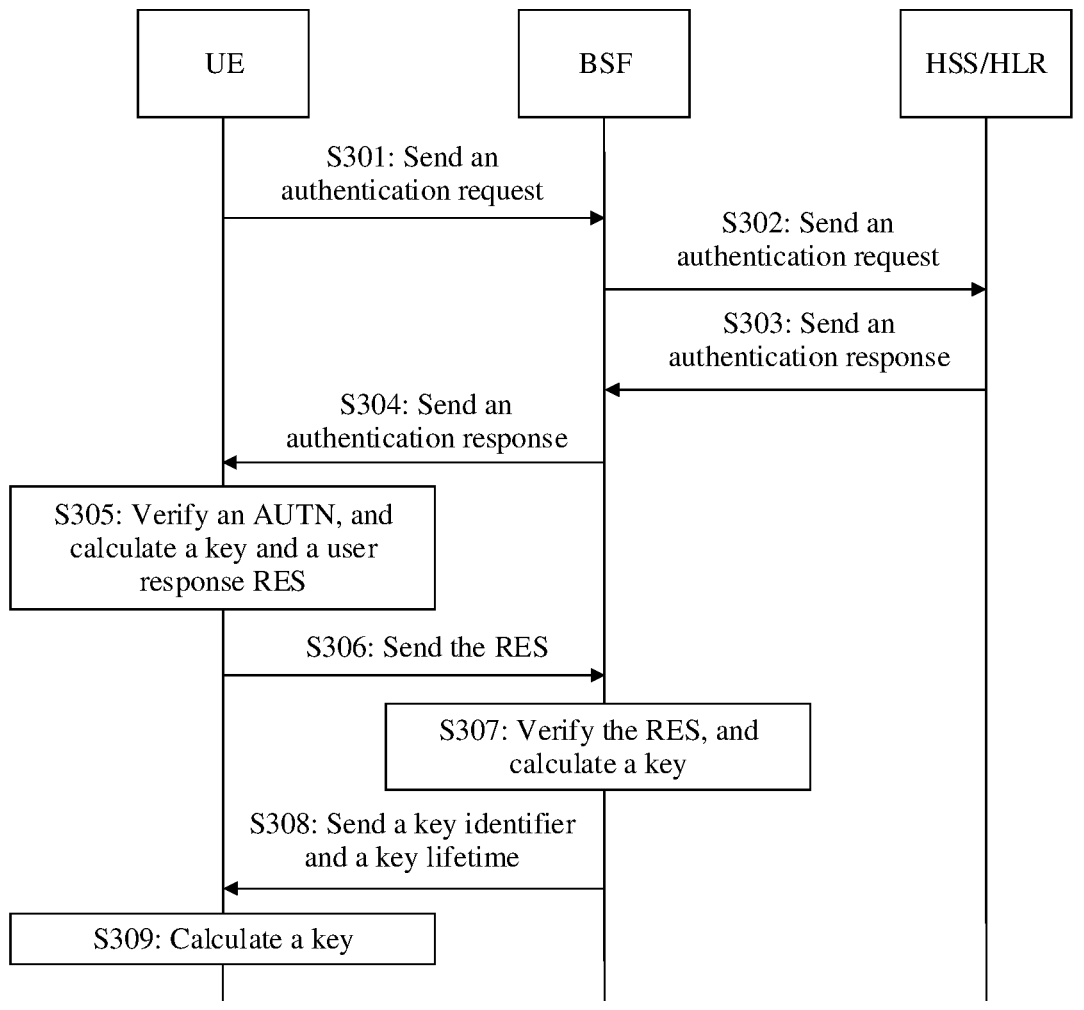

FIG. 3 shows an example of implementing the procedure of performing identity authentication and shared key generation between the UE and the core network by using the GBA technology in the 4G network.

In the defined GBA technical standard, participating network elements include the user equipment UE, a bootstrapping server function (bootstrapping server function, BSF), and a home subscriber server (home subscriber server, HSS)/home location register (home location register, HLR). The bootstrapping service function BSF, the home subscriber server HSS, and the home location register HLR are network elements or network element functions of a core network in a 4G network architecture. The BSF may serve as an intermediate hub, that is, may serve as an interface for interaction between network elements. The HSS is a server that can provide information about the UE, and the HSS may store an authentication-related parameter of the UE.

A procedure shown in FIG. 3 includes but is not limited to the following steps.

S301: The user equipment UE sends an authentication request to the bootstrapping server function BSF.

The authentication request message may include an identifier (ID) of the UE. In the 4G network, the identifier of the UE may be an international mobile subscriber identity (IMSI). It can be seen that, in a GBA procedure, the authentication request sent by the UE to the BSF carries a permanent international mobile subscriber identity IMSI of the UE, without a protection measure being taken for the authentication request. As a result, the IMSI is likely to be exposed, and user privacy is further exposed.

S302: The bootstrapping server function BSF sends an authentication request to the home subscriber server HSS/home location register HLR.

It should be understood that subscriber home servers are classified into HSSs and HLRs. The HSS may be used in a 4G communication system, and the HLR may be used in a 3G communication system.

The UE may send the identifier of the UE to the HSS/HLR. The HSS/HLR may determine, based on the identifier of the UE, a root key corresponding to the identifier of the UE, and obtain an authentication vector (authentication vector, AV) through calculation. Specifically, the authentication vector AV may include a random number RAND, an authentication token (AUTN), a cipher key (CK), an integrity key (IK), and an expected user response (XRES), e.g., AV=(RAND, AUTN, CK, IK, XRES).

S303: The home subscriber server HSS/home location register HLR sends an authentication response to the bootstrapping server function BSF.

The authentication response includes the authentication vector AV.

S304: The bootstrapping server function BSF sends an authentication response to the user equipment UE.

After receiving the authentication vector AV sent by the home subscriber server HSS/home location register HLR, the bootstrapping server function BSF may send, to the UE, the random number RAND and the authentication token AUTN that are included in the AV. That is, the random number RAND and the authentication token AUTN are included in the authentication response sent by the BSF to the user equipment UE.

S305: The user equipment UE verifies the authentication token AUTN, and calculates a key and a user response RES.

After receiving the random number RAND and the authentication token AUTN that are sent by the bootstrapping server function BSF, the UE may verify the authentication token AUTN, and calculate the shared key and the user response (user response, RES). Specifically, the UE may obtain the cipher key CK and the integrity key IK through calculation. The cipher key CK and the integrity key IK may be used to calculate a key of the UE.

S306: The user equipment UE sends the user response RES to the bootstrapping server function BSF.

S307: The bootstrapping server function BSF compares the expected user response XRES with the RES, to verify whether the RES is correct. The bootstrapping server function BSF calculates a key.

If the bootstrapping server function BSF verifies that the RES is correct, the bootstrapping server function BSF may calculate the key, where the key Ks=CK|IK.

S308: The bootstrapping server function BSF sends a key identifier and a key lifetime to the UE.

The key identifier is a bootstrapping transaction identifier (B-TID) and is generated by the bootstrapping server function BSF based on the random number RAND and a server name of the bootstrapping server function BSF. The B-TID may be base64encode(RAND)@BSF_servers_domain-_name. base64encode(RAND) may indicate that the random number RAND is converted by using base64.

S309: The UE calculates a key.

The UE calculates, based on the cipher key CK and the integrity key IK that are obtained through calculation, a key Ks=CK|IK corresponding to a key generated by the boot-strapping server function BSF.

In this case, identity authentication between the UE and the BSF is completed, that is, identity authentication between the UE and the core network is completed. The UE and the BSF further obtain a shared key Ks and the boot-strapping transaction identifier B-TID. The UE and the BSF further store the shared key Ks and the bootstrapping transaction identifier B-TID in association. The shared key may be used for subsequent interaction and communication between the UE and the core network.

If the GBA procedure shown in FIG. 3 is applied to the 5G network, the procedure becomes a 5G GBA procedure. In this case, a function of the bootstrapping server function BSF in the 4G network is similar to a function of the application security anchor function AAnf in the 5G net-work; and a function of the home subscriber server HSS in the 4G network is similar to a function of the unified data management UDM in the 5G network.

In the 5G GBA, each network element in the GBA procedure in the 4G network is still used except that the home subscriber server HSS is replaced with the unified data management UDM device. In addition, in the 5G GBA, the identifier of the UE in the procedure shown in FIG. 3 may be the SUPI; the bootstrapping transaction identifier B-TID in the procedure shown in FIG. 3 may be similar to the AKMA-key identifier A-KID in the 5G network; and a function of the shared key Ks in the procedure shown in FIG. 3 is similar to that of the shared key $K_{AKMK}$ in FIG. 2. If the GBA procedure (namely, the 5G GBA) is selected in the 5G network, the authentication request sent by the UE to the BSF carries the subscription permanent identifier SUPI of the UE, without a protection measure being taken for the authentication request. As a result, the SUPI is exposed, and user privacy is further exposed.

After identity authentication shared key generation between the UE and the core network is completed, the user equipment UE and the core network element need to further agree on the shared key, and then user plane message exchange can be performed. For example, the user plane message may be a discovery request sent by the UE to the application function AF in the D2D communication sce-nario, to trigger a procedure of discovering a neighboring communicable device.

In the existing technical solution, for example, in the D2D communication scenario in the 4G network, a plaintext permanent identifier of the UE is directly used in an inter-action and discovery process of the user equipment UE. Specifically, the discovery request sent by the UE to the core network carries the permanent identifier of the UE, and processing such as encryption is not performed on the permanent identifier. As a result, the identifier is likely to be stolen, and a specific user may be associated by using the permanent identifier of the UE, which exposes user privacy and poses a security risk. To resolve this problem, this application provides a secure communication method. The method includes a plurality of possible implementations, which are described one by one in the following.

In a possible implementation of this application, confi-dentiality protection is configured for communication infor-mation between the user equipment UE and the core net-work in a process of performing shared key agreement between the UE and a core network element. Specifically, for example, refer to FIG. 4, FIG. 5A, FIG. 5B, FIG. 5C, and FIG. 5D. The several figures show examples of the proce-dure of performing shared key agreement between the UE and the core network element according to this application.

Figure 4:
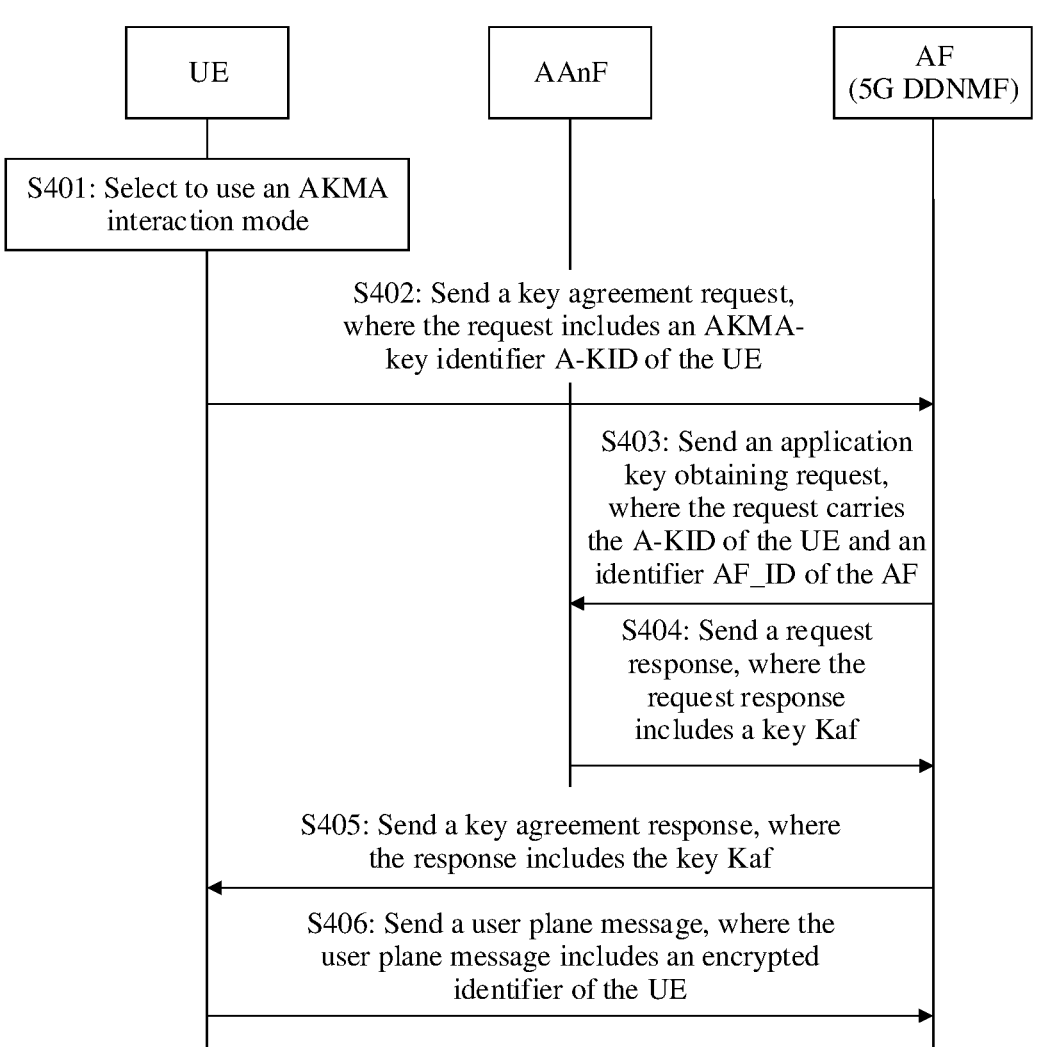
FIG. 4 is a schematic flowchart of a secure communication method according to an embodiment of this application.

First, refer to FIG. 4. The procedure of performing shared key agreement between the user equipment UE and the network element of the core network may include but is not limited to the following steps.

S401: The user equipment UE selects to use an AKMA interaction mode.

Specifically, the UE may select the interaction mode based on a privacy requirement of a user. The interaction mode may also be referred to as an interaction procedure, a procedure, or the like. The interaction mode is an interaction mode between the user equipment UE and the core network element. If there is the privacy requirement, an interaction mode with privacy protection, for example, the AKMA interaction mode or a 5G GBA interaction mode with a privacy protection capability, may be selected. If there is no privacy requirement, the AKMA interaction mode or 5G GBA interaction mode may be selected. The 5G GBA interaction mode with the privacy protection capability means that an identifier that does not expose the permanent identifier of the UE, for example, a subscription concealed identifier SUCI may be used for information exchange between the UE and the core network element, but the plaintext permanent identifier such as a SUPI is not used for information exchange.

The UE may select the interaction mode in one or more of the following.

(1) If the UE accesses a 5G network, and an application (application, APP) on the UE indicates that the application on the UE can use only the AKMA interaction mode, the UE determines to use the AKMA. The application may include any application installed on the UE. For example, it is assumed that the application is AppGallery. AppGallery preconfigures that an interaction mode between the UE and the 5G core network is the AKMA interaction mode pro-vided that the UE accesses the 5G network.

It should be noted that the application on the UE is an application started by the UE, an application function AF includes a server of the application, and a server correspond-ing to the application in the application function AF may provide (serves) a business logic (business logic) service for the application based on a plurality of protocols.

(2) If the UE accesses a 5G network, and an application indicates the UE that the application can use both the AKMA and the GBA, the UE first uses the AKMA. Optionally, if the UE accesses a 4G network, the UE can use only the GBA. That is, it may be understood as that the AKMA interaction mode is preferably used, provided that the 5G network is used. If the 4G network is used, the GBA interaction mode is used. That is, the interaction mode is distinguished through a network that the UE accesses.

(3) If the UE accesses a 5G network, and an application indicates the UE that the application can use both the AKMA and the GBA, the UE can determine whether to use the AKMA or GBA based on other information. For example, the interaction mode may be determined based on a priority delivered by a network, and the priority may be preconfigured on the UE. For example, the priority may be preconfigured by using a procedure related to a ProSe discovery procedure, such as service authorization described in section 5.2 in the 3GPP standard TS 23.303. Alternatively, the priority may be preconfigured in the application by an application provider. Alternatively, the priority may be preconfigured based on a user route selection policy (user route selection policy, URSP) rule delivered by a home network, that is, the URSP rule includes whether the AKMA interaction mode or the GBA interaction mode is preferably used.

(4) In a roaming case, based on an existing standard, the UE can only use the GBA interaction mode, because the AKMA interaction mode does not support the roaming case currently. In a possible implementation, if the AKMA interaction mode supports roaming, it is determined, based on a rule of a network visited by the UE, whether the GBA interaction mode or the AKMA interaction mode is preferably used. The network visited by the UE may deliver the rule to the UE in a protocol data unit (protocol data unit, PDU) session procedure, for example, notify the UE of a preferably used interaction mode by using a notification (notification) procedure.

(5) If the UE uses a 5G universal subscriber identity module (universal subscriber identity module, USIM), the UE preferably selects the AKMA interaction mode, because a 5G USIM user has a higher privacy requirement. Correspondingly, if the UE uses a 4G USIM, the UE may select both the AKMA interaction mode and the GBA interaction mode, but may still preferably select the AKMA interaction mode. This is not limited in embodiments. The reason is that parameters used for calculating the SUCI are stored only in the 5G USIM rather than the 4G USIM. When a 5G UE uses the 4G USIM, the SUCI can also be calculated, but the SUCI is null-encrypted. Null encryption means that there is no substantial encryption effect, just like no encryption. Specifically, the UE may determine, by using many methods, whether a USIM is the 5G USIM or the 4G USIM. Specifically, the UE may determine, based on a specific parameter that is included in only 5G, whether the USIM is the 5G USIM or the 4G USIM. For example, the specific parameter may be a public key, that is, the UE may determine according to whether a public key of the carrier is stored in the USIM. If there is the public key, the USIM is the 5G USIM. If there is no public key, the USIM is the 4G USIM. For another example, the specific parameter may be a public key identifier, and the UE may determine according to whether there is the public key identifier in the USIM. If there is the public key, the USIM is the 5G USIM. If there is no public key, the USIM is the 4G USIM. For another example, the USIM includes internal indication information, so that the UE knows whether the USIM is the 5G USIM or the 4G USIM.

(6) Default pre-configuration. The default pre-configuration may be a computer program. In running the computer program, whether to use the AKMA interaction mode or the GBA interaction mode can be automatically selected.

(7) The UE receives an indication input by the user, and selects to use the GBA interaction mode or the AKMA interaction mode based on the indication.

(8) The UE determines whether the permanent identifier needs to be sent in a subsequent procedure, for example, whether the SUPI needs to be sent to an AF. If the SUPI needs to be sent, the UE preferably uses an interaction mode with the privacy protection capability. For example, the UE determines to send a Discovery Request message to the AF, and the message needs to carry the SUPI. In this case, although the UE may select the GBA procedure or the AKMA procedure, the UE determines that the GBA procedure is not the interaction mode with the privacy protection capability, and may cause the SUPI to be leaked. Therefore, the UE selects the AKMA procedure instead of the GBA procedure.

Alternatively, for example, if the UE determines to send a Discovery Request message to an AF, the message carries the SUPI, and the UE determines that a GBA procedure and an AKMA procedure each are an interaction mode with a privacy protection capability, the UE may select the GBA interaction mode or the AKMA interaction mode.

The foregoing provides an example of several interaction mode selection methods. However, interaction mode selection methods in this solution are not limited to the foregoing several methods. A specific interaction mode selection method is not limited in this application.

According to one or more of the foregoing methods, it is assumed that the UE finally determines that the selected interaction mode is the AKMA interaction mode.

S402: The UE sends a key agreement request to the application function AF. The key agreement request includes an AKMA-key identifier A-KID of the UE.

It should be noted that, in the 5G network, in a proximity-based service (ProSe) discovery procedure in a D2D scenario, the application function AF may be a 5G direct discovery name management function (5G DDNMF).

In a possible implementation, after the UE selects to use the AKMA interaction mode, if the UE further agrees on a key by using a transport layer security TLS procedure, the key agreement request sent by the UE to the application function AF may be a Client Hello message.

In another possible implementation, the UE may not use a TLS procedure. In this case, the key agreement request sent by the UE to the application function AF may be an Application session establishment Request message.

Regardless of a message type, the key agreement request includes the AKMA-key identifier A-KID of the UE. The AKMA-key identifier A-KID may be an AKMA-key identifier A-KID obtained by the UE in the procedure shown in FIG. 2.

In a possible implementation, the key agreement request further includes information indicating that the AKMA interaction mode is used. The information is used to notify the application function AF that an interaction procedure selected by the user equipment is the AKMA procedure. The application function AF may operate based on the indication information and a requirement of the AKMA procedure, to implement key agreement with the user equipment UE.

S403: The application function AF sends an application key obtaining request to an application security anchor function AAnF. The request carries the A-KID of the UE and an identifier AF_ID of the AF.

Specifically, the AAnF receives the application key obtaining request from the AF, and obtains the A-KID and the AF_ID in the request. Then, the AAnF checks, based on a local policy configured for the AF_ID, authorization information, or a policy provided by a network function repository function NRF, whether the AAnF can provide a service for the AF. If the AAnF determines that the AAnF can provide the service for the AF, the AAnF locally searches for a key $K_{AKMK}$ of the UE based on the A-KID (in the procedure shown in FIG. 2, the SUPI, the key $K_{AKMK}$, and the AKMA-key identifier A-KID of the UE are stored in the application security anchor function AAnF in association). Then, it is verified based on the key $K_{AKMK}$ of the UE whether the UE is authorized to use the AKMA interaction mode. When determining that the UE is authorized to use the AKMA interaction mode, the AAnF generates an application key Kaf based on the key $K_{AKM}K$ of the UE.

S404: The application security anchor function AAnF sends a request response to the application function AF. The request response includes the key Kaf.

After generating the key Kaf, the application security anchor function AAnF carries the key Kaf in a response message of the key obtaining request and sends the response message to the AF.

S405: The application function AF sends a key agreement response to the user equipment UE.

The key agreement response is a response message for the key agreement request received by the AF.

If the key agreement request sent by the UE to the application function AF is the Client Hello message, the response message for the key agreement request may be a Server Hello message.

If the key agreement request sent by the UE to the application function AF is an Application session establishment Request message, the response message for the key agreement request may be an Application session establishment Response message.

The AF obtains the application key Kaf from the AAnF, indicating that the AF may further interact and communicate with the UE. In this case, the AF sends the key agreement response to the UE, and then the UE may start to send a user plane message to the AF.

The AF does not obtain the application key Kaf from the AAnF, indicating that the AF cannot further communicate with the UE. In this case, the key agreement response sent by the AF to the UE indicates that the UE and the AF cannot further communicate with each other, and the key agreement response includes a cause of a failure of further communication between the UE and the AF.

In addition, the user equipment UE may generate the application key Kaf based on the key $K_{AKMK}$ before the UE sends the key agreement request to the AF, or the UE may generate the application key Kaf based on the key $K_{AKMK}$ after the UE sends the key agreement request to the AF. After the AF obtains the application key Kaf from the AAnF that is also generated based on the $K_{AKMK}$, the AF and the UE may further implement communication based on the application key Kaf.

Optionally, after the UE selects to use the AKMA interaction mode, if the UE further agrees on a key by using the Transport Layer Security TLS procedure, the user equipment UE receives the key agreement response sent by the application function AF, and then sends a key agreement completion message to the application function AF.

S406: The user equipment UE sends the user plane message to the application function AF. The user plane message includes an encrypted identifier of the UE.

Completing key agreement between the UE and the AF indicates that secure communication has been established between the UE and the AF, and a message may be further exchanged and sent.

Optionally, in the D2D communication scenario, the user plane message that may be sent by the UE to the AF may be the discovery request (Discover Request) used to trigger discovery of a communicable device neighboring to the UE. Because the AKMA interaction mode is used, the identifier of the UE carried in the discovery request may be the encrypted identifier of the UE, for example, may be the subscription concealed identifier SUCI of the UE, a generic public subscription identifier (GPSI), or the AKMA-key identifier A-KID of the UE, to improve security of the UE and reduce a risk of exposing user privacy of the UE.

The procedure shown in FIG. 4 may be further applied to another communication scenario in addition to the D2D communication scenario. In this case, the user plane message sent by the UE to the AF may be another request message or the like. This is not limited in this solution.

In this application, key agreement between the UE and the AF is implemented by selecting the AKMA interaction mode. In a subsequent user plane interaction procedure, the subscription concealed identifier SUCI of the UE is used in the user plane message exchanged between the UE and the AF. Because the SUCI is obtained by performing processing, for example, encryption on the permanent identifier SUPI of the UE, the attacker cannot easily obtain the SUPI even after obtaining the SUCI. This effectively reduces a risk of leaking the permanent identifier of the user, and further reduces a risk of exposing user privacy.

Figure 5A:
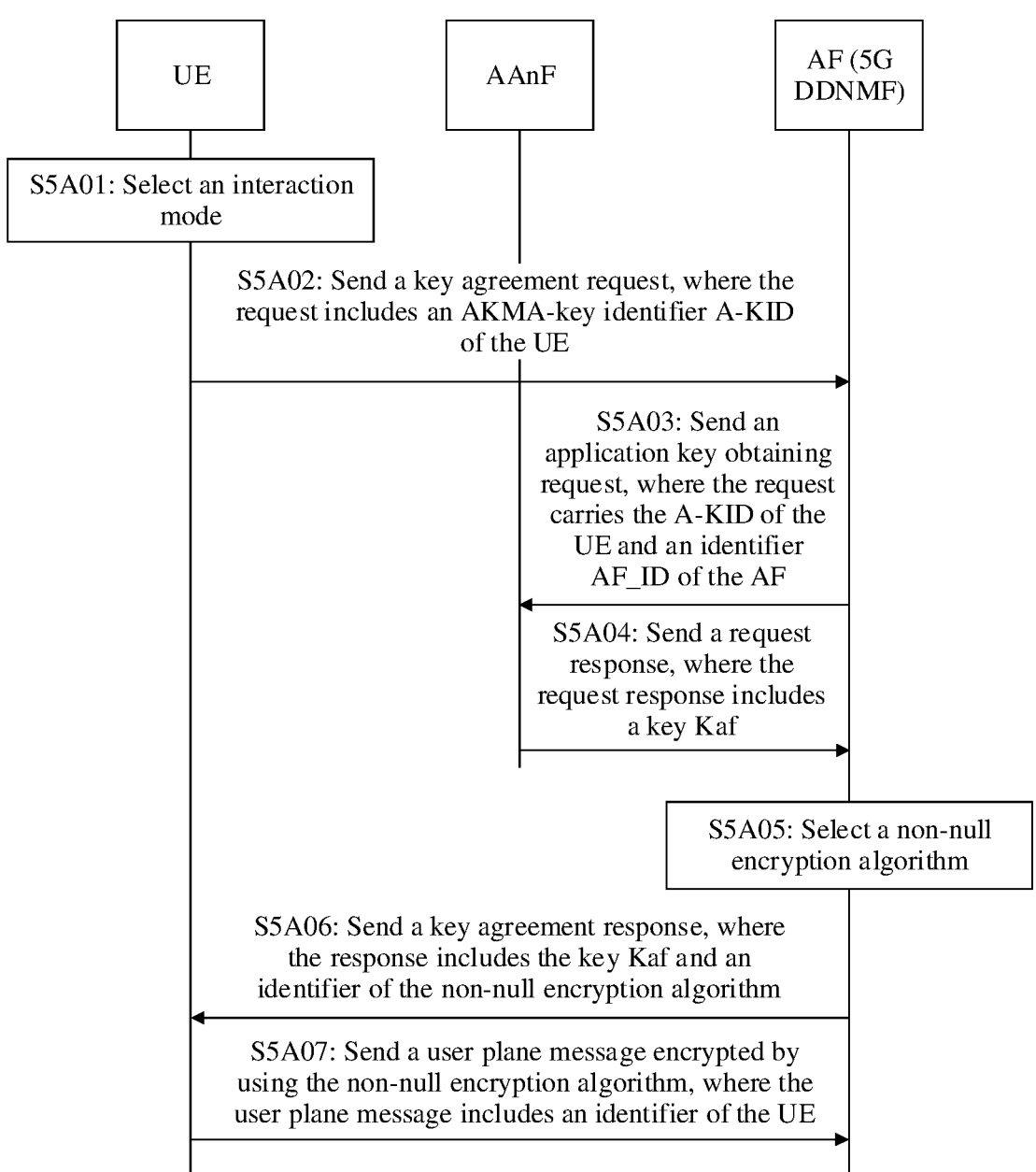
FIG. 5A to FIG. 5D are schematic flowcharts of a secure communication method according to an embodiment of this application.

Refer to FIG. 5A. FIG. 5A shows another possible implementation of configuring the confidentiality protection for communication information between the user equipment UE and the core network in a process of performing shared key agreement between the UE and the core network element according to an embodiment of this application. The procedure of performing shared key agreement between the user equipment UE and the core network element shown in FIG. 5A may include but is not limited to the following steps.

S5A01: The user equipment UE selects an interaction mode.

Specifically, for a method for selecting the interaction mode by the UE, refer to corresponding descriptions in step S401 shown in FIG. 4. Details are not described herein again. In this embodiment of this application, in a possible implementation, the UE determines that the selected interaction mode is the AKMA interaction mode. In another possible implementation, the UE determines that the selected interaction mode is the GBA interaction mode. The GBA interaction mode includes a 4G GBA interaction mode and the 5G GBA interaction mode. If the UE accesses the 4G network, the 4G GBA interaction mode is selected. If the UE accesses the 5G network, the 5G GBA interaction mode is selected. The procedure shown in FIG. 5A is first described by using an example in which the UE determines that the selected interaction mode is the AKMA interaction mode.

S5A02: The UE sends a key agreement request to the application function AF. The key agreement request includes an AKMA-key identifier A-KID of the UE.

S5A03: The application function AF sends an application key obtaining request to an application security anchor function AAnF. The request carries the A-KID of the UE and an identifier AF_ID of the AF.

S5A04: The application security anchor function AAnF sends a request response to the application function AF. The request response includes a key Kaf.

For specific descriptions of steps S5A02, S5A03, and S5A04, refer to corresponding descriptions in S402, S403, and S404 shown in FIG. 4.

S5A05: The application function AF selects a non-null encryption algorithm.

Specifically, in this embodiment of this application, the application function AF configures the non-null encryption algorithm. The non-null encryption algorithm may be an encryption algorithm such as HASH256, HASH128, or MD5, and is used to encrypt a subsequent message exchanged between the UE and the AF, to protect UE information and prevent user privacy from being exposed.

In a possible implementation, the AF may select the non-null encryption algorithm based on an indication of the user equipment UE. Specifically, when the UE sends the key agreement request to the application function AF, the key agreement request may include indication information indicating the AF to select the non-null encryption algorithm. The indication information may be bit indication information, or may be a pre-agreed identifier or code, or the like. This is not limited in this solution. The AF determines the non-null encryption algorithm based on the indication information of the non-null encryption algorithm. The non-null encryption algorithm is used to perform the confidentiality protection on a connection between the UE and the AF.

In a possible implementation, when the UE sends the key agreement request to the application function AF, the key agreement request carries indication information of an encryption algorithm supported by the UE, rather than indication information of the non-null encryption algorithm. The indication information of the non-null encryption algorithm may be an identifier, code, a name, or the like of the non-null encryption algorithm supported by the UE. The AF selects the encryption algorithm from an intersection set between the encryption algorithm supported by the UE and an encryption algorithm supported by the AF. Because the UE does not transmit the indication information of the non-null encryption algorithm, the AF considers that the UE does not support the non-null encryption algorithm. Therefore, the AF selects the non-null encryption algorithm from the intersection set.

In another possible implementation, it is assumed that the indication information indicating the AF to select the non-null encryption algorithm is referred to as encryption algorithm negotiation information. The encryption algorithm negotiation information may not be carried in the key agreement request, but is sent by the user equipment UE to the application function AF.

S5A06: The application function AF sends a key agreement response to the user equipment UE. The key agreement response includes the identifier of the non-null encryption algorithm.

The key agreement response is a response message for the key agreement request received by the AF.

After obtaining the key Kaf in step S5A04, the AF selects the non-null encryption algorithm, then carries the identifier of the non-null encryption algorithm in the response message for the key agreement request, and sends the response message to the UE. The identifier of the non-null encryption algorithm may be a name of the non-null encryption algorithm, a symbol or code that can indicate the algorithm, or the like.

If the key agreement request sent by the UE to the application function AF is a Client Hello message, the response message for the key agreement request may be a Server Hello message.

If the key agreement request sent by the UE to the application function AF is an Application session establishment Request message, the response message for the key agreement request may be an Application session establishment Response message.

In S5A04, the AF obtains the application key Kaf from the AAnF, indicating that the AF may further interact and communicate with the UE. In this case, the AF sends the key agreement response to the UE, and then the UE may start to send a user plane message to the AF.

The AF does not obtain the application key Kaf from the AAnF, indicating that the AF cannot further communicate with the UE. In this case, the key agreement response sent by the AF to the UE indicates that the UE and the AF cannot further communicate with each other, and the key agreement response includes a cause of a failure of further communication between the UE and the AF.

In addition, the user equipment UE may generate the application key Kaf based on a key $K_{AKMK}$ before the UE sends the key agreement request to the AF, or the UE may generate the application key Kaf based on a key $K_{AKMK}$ after the UE sends the key agreement request to the AF. After the AF obtains the application key Kaf from the AAnF that is also generated based on the $K_{AKMK}$, the AF and the UE may further implement communication based on the application key Kaf.

Optionally, after the UE selects to use the AKMA interaction mode, if the UE further agrees on a key by using a transport layer security TLS procedure, the user equipment UE receives the key agreement response sent by the application function AF, and then sends a key agreement completion message to the application function AF.

S5A07: The user equipment UE sends, to the application function AF, a user plane message encrypted by using the non-null encryption algorithm. The user plane message includes an identifier of the UE.

Completing key agreement between the UE and the AF indicates that secure communication has been established between the UE and the AF, and information may be further exchanged and sent.

Optionally, in the D2D communication scenario, the user plane message that may be sent by the UE to the AF may be the discovery request (Discover Request) used to trigger discovery of a communicable device neighboring to the UE.

If the application function AF and the UE negotiate to encrypt, by using the non-null encryption algorithm, a message exchanged between the AF and the UE, the user plane message sent by the UE to the AF is encrypted by using the selected non-null encryption algorithm. This increases security of the UE, and reduces a risk of exposing user privacy of the UE.

In a possible implementation, because the user plane message has been encrypted by using the non-null encryption algorithm, an identifier of the UE carried in the user plane message sent by the user equipment UE to the AF may be a subscription permanent identifier SUPI of the UE.

In a possible implementation, even if the user plane message has been encrypted by using the non-null encryption algorithm, the identifier of the UE carried in the user plane message sent by the user equipment UE to the AF may be an encrypted identifier such as a subscription concealed identifier SUCI of the UE, to further protect user privacy.

In a possible implementation, before sending the user plane message to the application function AF, the user equipment UE may first check whether confidentiality protection between the UE and the AF is activated. Optionally, a manner in which the user equipment checks whether the confidentiality protection is activated may be: checking whether the UE and the AF negotiate to encrypt the exchanged information by using the non-null encryption algorithm. If the non-null encryption algorithm is used, it indicates that the confidentiality protection is activated. If the non-null encryption algorithm is not selected, the confidentiality protection is inactivated. Optionally, a manner in which the user equipment checks whether the confidentiality protection is activated may be: checking whether the key agreement request carries information indicating the AF to select the non-null encryption algorithm. If the key agreement request carries the information, it indicates that the confidentiality protection is activated. It should be noted that, if the key agreement request does not carry the information, this does not necessarily indicate that the confidentiality protection is inactivated. Whether the confidentiality protection is activated may be further confirmed by using another method. When the confidentiality protection is activated, the identifier of the UE carried in the user plane message sent by the UE to the AF may be the subscription permanent identifier SUPI of the UE.

In a possible implementation, in FIG. 5A, if the key agreement request sent by the UE to the application function AF is the Application session establishment Request message in step S5A02, and the response message for the key agreement request is the Application session establishment Response message in step S5A06, the AF may not select the non-null encryption algorithm first in step S5A05, and the Application session establishment Response message may not include the identifier of the non-null encryption algorithm. After the UE receives the Application session establishment Response, the non-null encryption algorithm may be configured between the UE and the AF based on the procedure in FIG. 5A. In this case, the key agreement request sent by the UE to the application function AF is the Client Hello message in step S5A02, and the response message for the key agreement request is the Server Hello message in step S5A06.

Figure 5B:
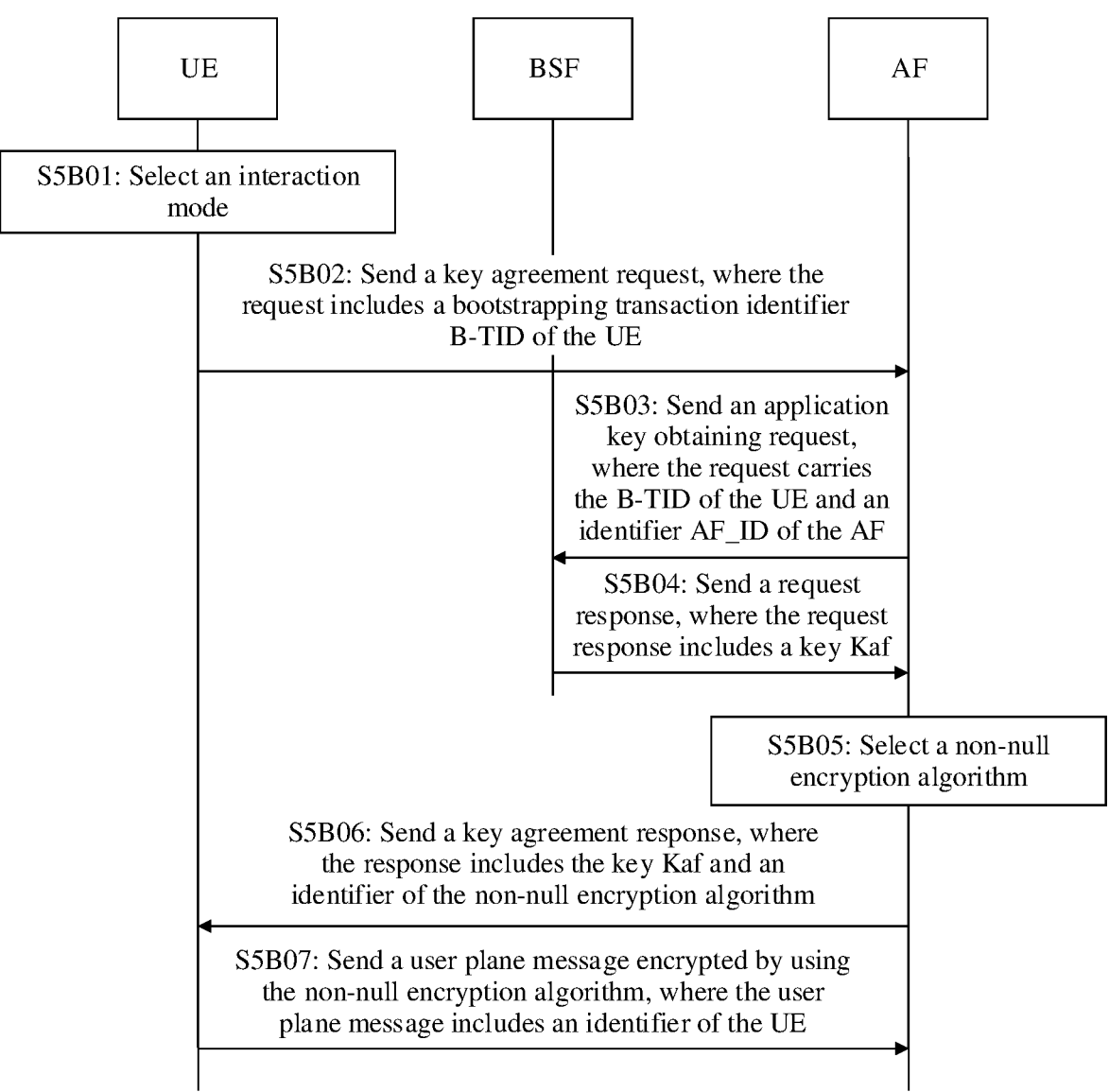

In a possible implementation, refer to FIG. 5B. FIG. 5B shows an example of a process in which the UE selects a GBA interaction mode to implement shared key agreement between the UE and the core network element. The process may include but is not limited to the following steps.

S5B01: The user equipment UE selects an interaction mode.

Specifically, for a method for selecting the interaction mode by the UE, refer to corresponding descriptions in step S401 shown in FIG. 4. Details are not described herein again. The procedure shown in FIG. 5B is described by using an example in which the UE determines that the selected interaction mode is the GBA interaction mode.

It can be learned from the foregoing descriptions that the 5G GBA interaction mode basically uses a network element in a 4G GBA interaction mode. Therefore, compared with the AKMA interaction mode shown in FIG. 5A, in terms of an interacted element, the application security anchor function AAnF is replaced with a bootstrapping server function BSF in the GBA interaction mode.

S5B02: The UE sends a key agreement request to the application function AF. The key agreement request includes a bootstrapping transaction identifier B-TID of the UE.

The bootstrapping transaction identifier B-TID is obtained by the UE in the procedure shown in FIG. 3. In addition, the application function AF may be a network application function (NAF).

Optionally, in a proximity-based service ProSe discovery procedure in the D2D scenario, the application function AF may be a direct discovery name management function 5G DDNMF.

In a possible implementation, after the UE selects to use the GBA interaction mode, if the UE further agrees on a key by using a transport layer security TLS procedure, the key agreement request sent by the UE to the application function AF may be a Client Hello message.

In another possible implementation, the UE may not use the TLS procedure. In this case, the key agreement request sent by the UE to the application function AF may be an Application Request message or the like.

Regardless of a message type, the key agreement request includes the bootstrapping transaction identifier B-TID of the UE.

S5B03: The application function AF sends an application key obtaining request to the bootstrapping server function BSF. The request carries the B-TID of the UE and an identifier AF_ID of the AF.

Specifically, the BSF receives the application key obtaining request of the AF, obtains the B-TID and the AF_ID in the request, and then checks, based on the AF_ID, whether the BSF can provide a service for the AF. If the BSF determines that the BSF can provide the service for the AF, the BSF locally searches for a key Ks of the UE based on the B-TID (in the procedure shown in FIG. 3, the BSF has stored the shared key Ks and the bootstrapping transaction identifier B-TID in association), and then verifies, based on the key Ks of the UE, whether the UE is authorized to use the GBA interaction mode. When determining that the UE is authorized to use the GBA interaction mode, the BSF generates an application key Kaf based on the key Ks of the UE. If the application function AF is the network application function NAF, the key Kaf may be Ks_ext/int_NAF.

Optionally, if the UE further agrees on a key by using the Transport Layer Security TLS procedure, the application key obtaining request sent by the AF to the BSF may be an Authentication Request message or the like.

Optionally, if the UE agrees on a key by using another procedure rather than the Transport Layer Security TLS procedure, the key obtaining request may also be the Authentication Request message or the like.

S5B04: The bootstrapping server function BSF sends a request response to the application function AF. The request response includes the key Kaf.

After generating the key Kaf, the bootstrapping server function BSF carries the key Kaf in a response message for the key obtaining request, and sends the response message to the AF.

Optionally, if the UE further agrees on a key by using the Transport Layer Security TLS procedure, the request response sent by the BSF to the AF may be an Authentication Answer message or the like.

Optionally, if the UE does not agree on a key by using the TLS procedure, the request response may also be the Authentication Answer message or the like.

S5B05: The application function AF selects a non-null encryption algorithm.

Specifically, in this embodiment of this application, the application function AF configures the non-null encryption algorithm. The non-null encryption algorithm may be an encryption algorithm such as SHA256, SHA128, or MD5, and is used to encrypt a subsequent message exchanged between the UE and the AF, to protect UE information and prevent user privacy from being exposed.

In a possible implementation, the AF may select the non-null encryption algorithm based on an indication of the user equipment UE. Specifically, when the UE sends the key agreement request to the application function AF, the key agreement request may include indication information indicating the AF to select the non-null encryption algorithm. The indication information may be bit indication information, or may be a pre-agreed identifier or code, or the like. This is not limited in this solution. The AF determines the non-null encryption algorithm based on the indication information of the non-null encryption algorithm. The non-null encryption algorithm is used to perform the confidentiality protection on a connection between the UE and the AF.

In a possible implementation, when the UE sends the key agreement request to the application function AF, the key agreement request carries indication information of an encryption algorithm supported by the UE, and does not include indication information of the non-null encryption algorithm. The AF selects the encryption algorithm from an intersection set between the encryption algorithm supported by the UE and an encryption algorithm supported by the AF. Because the UE does not transmit the indication information of the non-null encryption algorithm, the AF considers that the UE does not support the non-null encryption algorithm. Therefore, the AF selects the non-null encryption algorithm from the intersection set.

In another possible implementation, it is assumed that the indication information indicating the AF to select the non-null encryption algorithm is referred to as encryption algorithm negotiation information. The encryption algorithm negotiation information may not be carried in the key agreement request, but is sent by the user equipment UE to the application function AF.

S5B06: The application function AF sends a key agreement response to the user equipment UE. The key agreement response includes an identifier of the non-null encryption algorithm.

The key agreement response is a response message for the key agreement request received by the AF.

After obtaining the key Kaf in step S5B04, the AF selects the non-null encryption algorithm, then carries the identifier of the non-null encryption algorithm in the response message for the key agreement request, and sends the response message to the UE. The identifier of the non-null encryption algorithm may be a name of the non-null encryption algorithm, a symbol or code that can indicate the algorithm, or the like.

If the key agreement request sent by the UE to the application function AF is the Client Hello message, the response message for the key agreement request may be a Server Hello message.

If the key agreement request sent by the UE to the application function AF is the Application Request message, the response message for the key agreement request may be an Application Answer message.

In S5B04, the AF obtains the application key Kaf from the BSF, indicating that the AF may further interact and communicate with the UE. In this case, the AF sends the key agreement response to the UE, and then the UE may start to send a user plane message to the AF.

The AF does not obtain the application key Kaf from the BSF, indicating that the AF cannot further communicate with the UE. In this case, the key agreement response sent by the AF to the UE indicates that the UE and the AF cannot further communicate with each other, and the key agreement response includes a cause of a failure of further communication between the UE and the AF.

In addition, the user equipment UE may generate the application key Kaf based on the key Ks before the UE sends the key agreement request to the AF, or the UE may generate the application key Kaf based on the key Ks after the UE sends the key agreement request to the AF. After the AF obtains the application key Kaf from the BSF that is also generated based on Ks, the AF and the UE may further implement communication based on the application key Kaf.

Optionally, after the UE selects to use the GBA interaction mode, if the UE further agrees on a key by using the Transport Layer Security TLS procedure, the user equipment UE receives the key agreement response sent by the application function AF, and then sends a key agreement completion message to the application function AF.

S5B07: The user equipment UE sends, to the application function AF, a user plane message encrypted by using the non-null encryption algorithm. The user plane message includes an identifier of the UE.

Completing key agreement between the UE and the AF indicates that secure communication has been established between the UE and the AF, and information may be further exchanged and sent.

Optionally, in the D2D communication scenario, the user plane message that may be sent by the UE to the AF may be the discovery request (Discover Request) used to trigger discovery of a communicable device neighboring to the UE.

If the application function AF and the UE negotiate to encrypt, by using the non-null encryption algorithm, a message exchanged between the AF and the UE, the user plane message sent by the UE to the AF is encrypted by using the selected non-null encryption algorithm. This increases security of the UE, and reduces a risk of exposing user privacy of the UE.

In a possible implementation, because the user plane message has been encrypted by using the non-null encryption algorithm, an identifier of the UE carried in the user plane message sent by the user equipment UE to the AF may be a subscription permanent identifier SUPI of the UE.

In a possible implementation, even if the user plane message has been encrypted by using the non-null encryption algorithm, the identifier of the UE carried in the user plane message sent by the user equipment UE to the AF may be an encrypted identifier such as a subscription concealed identifier SUCI of the UE, to further protect user privacy.

In a possible implementation, before sending the user plane message to the application function AF, the user equipment UE may first check whether confidentiality protection between the UE and the AF is activated. Optionally, a manner in which the user equipment checks whether the confidentiality protection is activated may be: checking whether the UE and the AF negotiate to encrypt the exchanged information by using the non-null encryption algorithm. If the non-null encryption algorithm is used, it indicates that the confidentiality protection is activated. If the non-null encryption algorithm is not selected, the confidentiality protection is inactivated. Optionally, a manner in which the user equipment checks whether the confidentiality protection is activated may be: checking whether the key agreement request carries information indicating the AF to select the non-null encryption algorithm. If the key agreement request carries the information, it indicates that the confidentiality protection is activated. It should be noted that, if the key agreement request does not carry the information, this does not necessarily indicate that the confidentiality protection is inactivated. Whether the confidentiality protection is activated may be further confirmed by using another method. When the confidentiality protection is activated, the identifier of the UE carried in the user plane message sent by the UE to the AF may be the subscription permanent identifier SUPI of the UE.

Figure 5C:
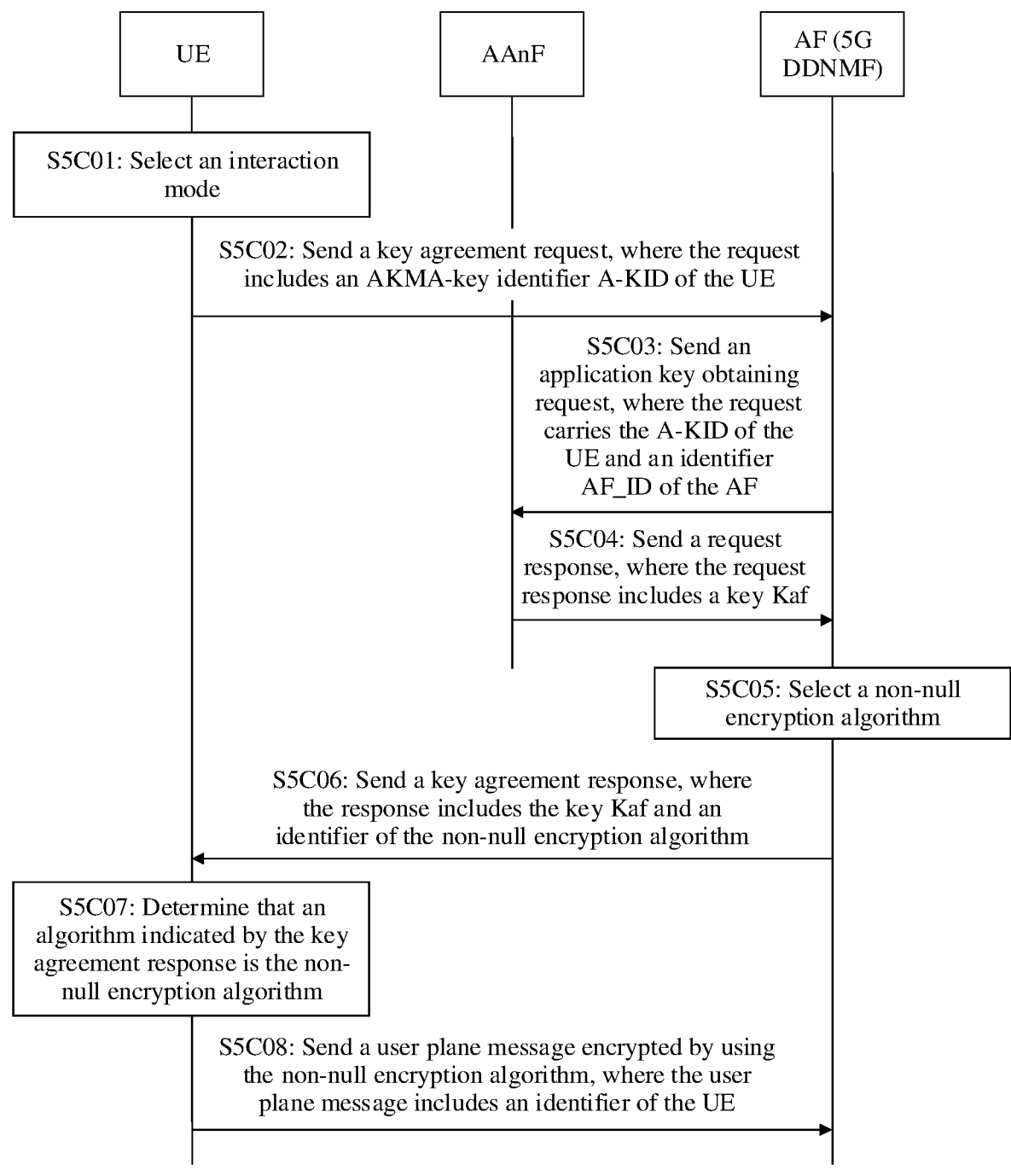

In a possible implementation, refer to FIG. 5C. In FIG. 5C, a step is added on user equipment UE side based on the procedure shown in FIG. 5A. The added step is step S5C07 in FIG. 5C. In S5C07, the UE determines that an algorithm indicated by the key agreement response is the non-null encryption algorithm. Specifically, after receiving the key agreement response sent by the AF, the UE may further verify, based on an identifier of an algorithm carried in the key agreement response, whether the algorithm is the non-null encryption algorithm. For example, the identifier of the received algorithm may be compared with an identifier of a locally stored non-null encryption algorithm. If the identifier of the received algorithm is the same as an identifier of a local non-null encryption algorithm, it is verified that the identifier of the received algorithm is the non-null encryption algorithm identifier. In FIG. 5C, for a specific implementation of other steps except step S5C07, refer to the foregoing specific descriptions of FIG. 5A. Details are not described herein again.

Figure 5D:
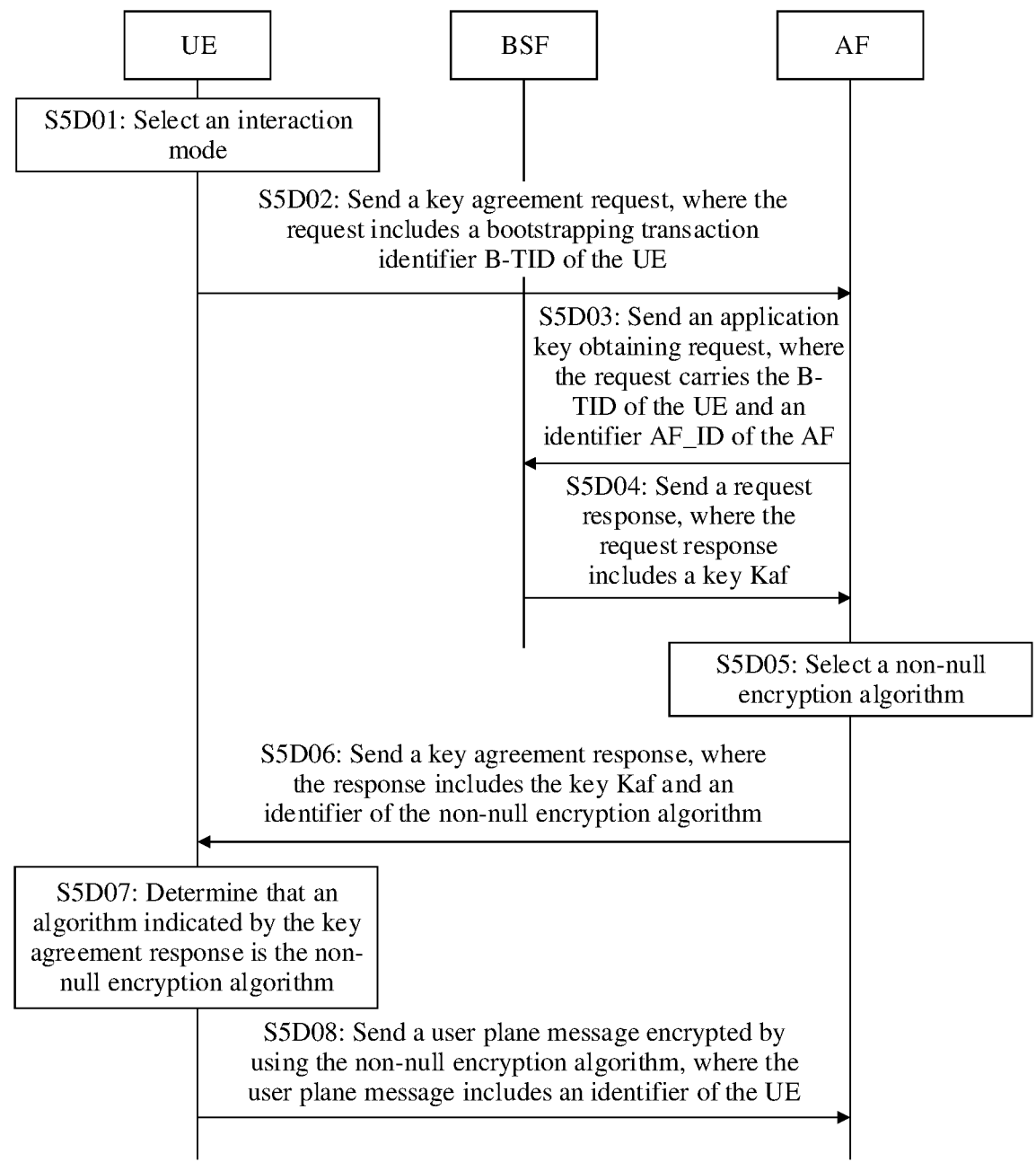

In a possible implementation, refer to FIG. 5D. In FIG. 5D, a step is added on user equipment UE side based on the procedure shown in FIG. 5B. The added step is step S5D07 in FIG. 5D. In FIG. 5D, the UE determines that an algorithm indicated by the key agreement response is the non-null encryption algorithm. Specifically, after receiving the key agreement response sent by the AF, the UE may further verify, based on an identifier of an algorithm carried in the key agreement response, whether the algorithm is the non-null encryption algorithm. For example, the identifier of the received algorithm may be compared with an identifier of a locally stored non-null encryption algorithm. If the identifier of the received algorithm is the same as an identifier of a local non-null encryption algorithm, it is verified that the identifier of the received algorithm is the non-null encryption algorithm identifier. In FIG. 5D, for a specific implementation of other steps except step S5D07, refer to the foregoing specific descriptions of FIG. 5B. Details are not described herein again.

In a possible implementation, if the application function AF may select only a null encryption algorithm in step S5A05 in FIG. 5A, step S5B05 in FIG. 5B, or step S5C05 in FIG. 5C, if it is verified on the UE side that the identifier of the received algorithm is an identifier of a null algorithm in step S5C07 in FIG. 5C, or if it is verified on the UE side that the identifier of the received algorithm is an identifier of a null algorithm in step S5D07 in FIG. 5D, in a possible implementation, the UE may terminate a subsequent procedure, that is, no longer initiate a discovery request, to prevent the permanent identifier of the UE from being leaked.

Optionally, after terminating the procedure, the UE may send, to the AF, a message indicating a reason for terminating the procedure.

Optionally, after terminating the procedure, the UE may re-initiate the key agreement procedure shown in FIG. 5A, FIG. 5B, FIG. 5C, or FIG. 5D. If the UE detects that the identifier of the received algorithm is the identifier of the null algorithm again, the UE may not terminate a subsequent procedure, and continue to send a discovery request to the AF to trigger discovery of a communicable device neighboring to the UE, to prevent the UE from accessing the network. Alternatively, if the UE detects that the identifier of the received algorithm is the identifier of the null algorithm again, for security of UE information, the UE may terminate a subsequent procedure again.

Optionally, after terminating the procedure again, the UE may send, to the AF again, a message indicating a reason for terminating the procedure.

Optionally, after terminating the procedure again, the UE may start a timer. The timer is used to prevent the UE from re-accessing the network, that is, within a timing period of the timer, the UE does not initiate the key agreement procedure shown in FIG. 5A to FIG. 5C again. Optionally, after the privacy security problem is resolved, for example, after the AF no longer selects the null encryption algorithm, the UE may re-initiate the key agreement procedure shown in FIG. 5A, FIG. 5B, FIG. 5C, or FIG. 5D.

In a possible implementation, if it is verified on the UE side that the identifier of the received algorithm is an identifier of a null algorithm in step S5C07 in FIG. 5C or step S5D07 in FIG. 5D, the UE may send a request for obtaining the non-null encryption algorithm to the application function AF again. Optionally, the request may be the key agreement request sent by the UE to the AF. The request for obtaining the non-null encryption algorithm includes indication information indicating the AF to select the non-null encryption algorithm. The indication information may be bit indication information, or may be a pre-agreed identifier or code, or the like. This is not limited in this solution. The AF determines the non-null encryption algorithm based on the indication information of the non-null encryption algorithm. The non-null encryption algorithm is used to perform the confidentiality protection on the connection between the UE and the AF.

In a possible implementation, when the UE sends the request for obtaining the non-null encryption algorithm to the application function AF, the request does not include the indication information indicating the AF to select the non-null encryption algorithm. That is, the request has a function of indicating the AF to select the non-null encryption algorithm. After receiving the request, the AF selects the non-null encryption algorithm from the intersection set between the encryption algorithm supported by the UE and the encryption algorithm supported by the AF, and sends the selected algorithm to the UE.

In a possible implementation, when the UE sends the request for obtaining the non-null encryption algorithm to the application function AF, the request does not include the indication information indicating the AF to select the non-null encryption algorithm. After receiving the request, the AF selects, based on a specific service function of the AF, the non-null encryption algorithm from the intersection set between the encryption algorithm supported by the UE and the encryption algorithm supported by the AF, and sends the selected algorithm to the UE. The meaning of the specific service function of the AF is that the AF knows, based on preconfigured information, a service to be provided for the UE. For example, if the AF is the 5G DDNMF, the AF may be configured with only the non-null encryption algorithm. Therefore, when the AF selects an encryption algorithm, the AF can select only the non-null encryption algorithm.

In a possible implementation, in FIG. 4, FIG. 5A to FIG. 5D, and the possible implementations, the confidentiality protection is mainly configured for a communication connection between the user equipment UE and the core network element or a third-party application server. Optionally, integrity protection may further be configured for the communication connection between the user equipment UE and the core network element or the third-party application server. For a specific configuration, refer to the existing technical solution. This is not limited in this application.

Alternatively, in this embodiment of this application, when selecting the non-null encryption algorithm, the application function AF may further select an integrity protection algorithm to protect integrity of information exchanged and communicated between the UE and the AF. Then, the application function AF adds both the identifier of the non-null encryption algorithm and an identifier of the integrity protection algorithm to an authentication response, and sends the authentication response to the user equipment UE.

Optionally, the non-null encryption algorithm and the integrity protection algorithm may not be selected at the same time, or may be selected separately. The AF first selects the non-null encryption algorithm, and sends the identifier of the non-null encryption algorithm to the UE. Then, the AF selects the integrity protection algorithm, and sends the identifier of the integrity protection algorithm to the UE. Alternatively, the two algorithms may be selected in a reversed order. This is not limited in this solution.

In a possible implementation, before sending the discovery request to the application function AF, the user equipment UE may first check whether the confidentiality protection and the integrity protection between the UE and the AF are activated. Optionally, a manner in which the user equipment checks whether the confidentiality protection is activated may be: checking whether the UE and the AF negotiate to encrypt the exchanged information by using the non-null encryption algorithm. If the non-null encryption algorithm is used, it indicates that the confidentiality protection is activated. If the non-null encryption algorithm is not selected, the confidentiality protection is inactivated. Optionally, a manner in which the user equipment checks whether the confidentiality protection is activated may be: checking whether the key agreement request carries information indicating the AF to select the non-null encryption algorithm. If the key agreement request carries the information, it indicates that the confidentiality protection is activated. It should be noted that, if the key agreement request does not carry the information, this does not necessarily indicate that the confidentiality protection is inactivated. Whether the confidentiality protection is activated may be further confirmed by using another method. The integrity protection means whether the UE and AF negotiate to use the integrity protection algorithm to encrypt the exchanged information to ensure information integrity. When the confidentiality protection and the integrity protection are both activated, the identifier of the UE carried in the discovery request sent by the UE to the AF may be the subscription permanent identifier SUPI of the UE.

The foregoing describes the implementation of configuring the confidentiality protection for the communication connection between the user equipment UE and the core network element in the process of performing shared key agreement between the UE and the core network element. This application may further provide another possible implementation. To be specific, a confidentiality protection policy is configured for the communication connection between the UE and the core network element in a process in which the UE sends a user plane message to the core network element such as an AF (the AF may be a 5G DDNMF) to trigger further interactive communication, for example, in a process in which the UE sends a discovery request to the AF to trigger discovery of a communicable device neighboring to the UE. This embodiment of this application may be implemented regardless of whether the confidentiality protection policy has been configured in the process of performing shared key agreement between the UE and the core network element. Specifically, for example, refer to several possible implementations shown in FIG. 6 to FIG. 9. The following describes the implementations one by one.

Figures 6, 7:
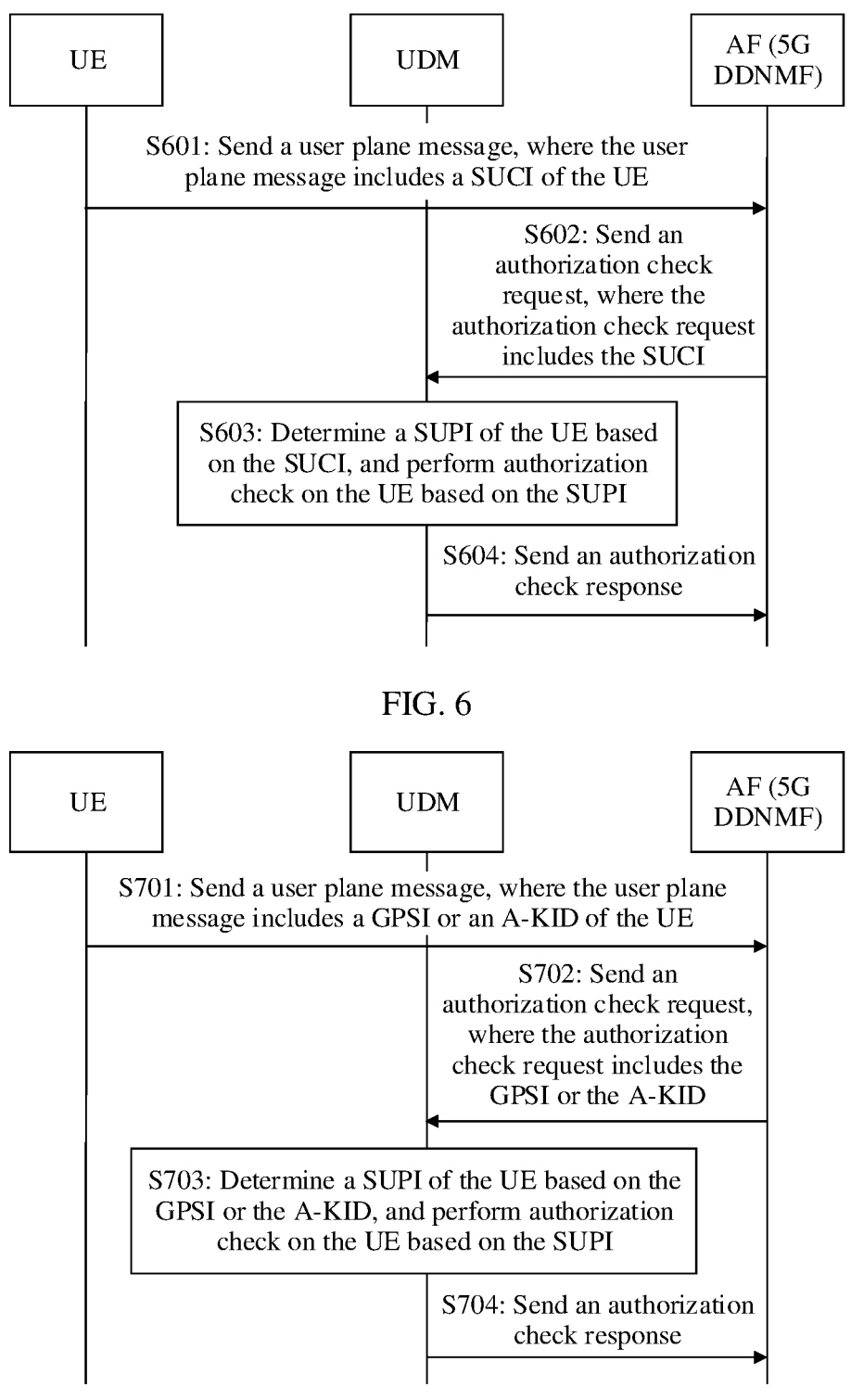
FIG. 6 to FIG. 9 are schematic flowcharts of a secure communication method according to an embodiment of this application.

FIG. 6 shows an example of a possible implementation in which the confidentiality protection policy is configured for communication information between the UE and the core network element in the process in which the UE sends the user plane message to the core network element to trigger further interactive communication. The implementation includes but is not limited to the following steps.

S601: The user equipment UE sends the user plane message to the application function AF. The user plane message includes a subscription concealed identifier SUCI of the UE.

It should be noted that, in a 5G network, in a proximity-based service ProSe discovery procedure in a D2D scenario, the application function AF may be a direct discovery name management function 5G DDNMF in the 5G network. In this scenario, the user plane message that may be sent by the UE to the AF may be the discovery request (Discover Request) used to trigger discovery of the communicable device neighboring to the UE.

This application may be further applied to another communication scenario in addition to the D2D communication scenario. In this case, the user plane message sent by the UE to the AF may be another request message or the like. This is not limited in this solution. The following uses an example in which the user plane message is the discovery request (Discover Request).

In this embodiment of this application, the discovery request carries the subscription concealed identifier of the UE. This can reduce a risk of exposing user privacy of the UE.

In a possible implementation, before the user equipment UE sends the discovery request to the application function AF, the UE may further first check whether confidentiality protection between the UE and the AF is activated. For example, refer to FIG. 9. For a specific implementation of determining, by the user equipment UE, whether confidentiality protection is activated for communication data between the user equipment UE and the application function AF in S901 in FIG. 9, refer to the foregoing detailed descriptions of enabling confidentiality protection. Details are not described herein again. After checking whether the confidentiality protection is activated, the UE may send the user plane message to the AF. Refer to step S902. If the confidentiality protection is activated, an identifier of the user equipment that is carried in the user plane message may be a permanent identifier or may be an encrypted identifier. If the confidentiality protection is inactivated, an identifier of the user equipment that is carried in the user plane message is an encrypted identifier. If the encrypted identifier is the subscription concealed identifier SUCI of the UE, S902 corresponds to S601.

In a possible implementation, before the user equipment UE sends the discovery request to the application function AF, the UE may further first check whether integrity protection between the UE and the AF is activated. If the integrity protection is inactivated, the identifier of the UE that is included in the discovery request sent by the UE to the AF is the subscription concealed identifier of the UE. For a manner of checking whether the integrity protection is activated, refer to the foregoing descriptions. Details are not described herein and below again.

S602: The application function AF sends an authorization check request to a unified data management UDM device.

The authorization check request includes the subscription concealed identifier SUCI of the UE.

Specifically, the authorization check request sent by the AF to the UDM is used to determine whether the UE is authorized to communicate with the neighboring device. Only when the UE is authorized, the AF continues to, based on the discovery request sent by the UE, search for and discover the communicable device neighboring to the UE.

The UDM performs authorization check based on the permanent identifier of the UE. The identifier of the UE that is obtained by the AF from the discovery request of the UE is the SUCI. Therefore, the authorization request sent by the AF to the UDM includes the SUCI, and the UDM may obtain the permanent identifier of the UE based on the SUCI.

In a current network architecture, the AF may directly or indirectly communicate with the UDM. This embodiment is described by using an example in which the AF may directly communicate with the UDM. It may be understood that, when one AF can only indirectly communicate with the UDM, for example, by using a network exposure function NEF, this embodiment may be automatically extended and adapted to the scenario. In this case, interaction between the AF and the UDM in this embodiment automatically includes an interaction process between the AF, the NEF, and the UDM.

S603: The unified data management UDM device determines a SUPI of the UE based on the SUCI, and performs the authorization check on the UE based on the SUPI.

Specifically, after receiving the authorization check request of the AF, the UDM obtains the SUCI in the authorization check request. The UDM may store and manage the subscription permanent identifier SUPI, and restore the SUPI from the subscription concealed identifier SUCI, for example, decrypt the SUCI by using a decryption function (a part of the UDM, or a function outside the UDM). Therefore, the UDM may obtain the subscription permanent identifier SUPI of the UE from the SUCI obtained from the authorization check request.

Whether the UE can be authorized to communicate with the neighboring device is specified in subscription information of the UE during registration, and the subscription information is stored in the UDM. In this case, after obtaining the subscription permanent identifier SUPI of the UE, the UDM searches for the subscription information of the UE based on the SUPI, to determine whether the UE is authorized to communicate with the neighboring device. If the subscription information specifies that the UE can communicate with the neighboring device, the authorization check performed on the UE succeeds; otherwise, the authorization check fails.

S604: The unified data management UDM device sends an authorization check response to the application function AF.

Specifically, if the authorization check performed on the UE succeeds in step S603, the authorization check response sent by the UDM to the AF indicates implicitly (for example, nothing is transferred) or explicitly (for example, a specific authorization result is sent, or a message carries a parameter relating to a proximity-based service of the UE) that the authorization check performed on the UE succeeds. In this case, the AF may further perform an operation of searching for and discovering a neighboring device that can communicate with the UE. Optionally, the authorization check response indicating that the authorization check performed on the UE succeeds may include the subscription permanent identifier SUPI of the UE, and the SUPI is used by the AF to subsequently interact with another core network element to obtain another parameter of the UE, for example, QoS information. Alternatively, the authorization check response indicating that the authorization check performed on the UE succeeds may not include the SUPI, or even may not include any valid information, and a null response is returned.

If the authorization check performed on the UE fails in step S603, the authorization check response sent by the UDM to the AF indicates that the authorization check performed on the UE fails. In this case, the AF cannot further perform an operation of searching for and discovering a neighboring device that can communicate with the UE.

FIG. 7 shows an example of another possible implementation in which the confidentiality protection policy is configured for communication information between the UE and the core network element in the process in which the UE sends the user plane message to the core network element to trigger further interactive communication. The implementation includes but is not limited to the following steps.

S701: The user equipment UE sends the user plane message to the application function AF. The user plane message includes a generic public subscription identifier (generic public subscription identifier, GPSI) or an AKMA-key identifier A-KID of the UE.

The A-KID may be newly generated by the UE. The AF may correspondingly generate a new A-KID that is the same as that of the UE, or obtain the new A-KID from an AAnF. The A-KID may alternatively be the A-KID carried in step SA502 or step SC502, namely, the already used A-KID. This is not specifically limited in the present invention.

It should be noted that, in a 5G network, in a proximity-based service ProSe discovery procedure in a D2D scenario, the application function AF may be a direct discovery name management function 5G DDNMF in the 5G network. In this scenario, the user plane message that may be sent by the UE to the AF may be the discovery request (Discover Request) used to trigger discovery of the communicable device neighboring to the UE.

This application may be further applied to another communication scenario in addition to the D2D communication scenario. In this case, the user plane message sent by the UE to the AF may be another request message or the like. This is not limited in this solution. The following uses an example in which the user plane message is the discovery request.

Specifically, usually, the GPSI of the UE is an identifier of the UE used by the UE outside a core network, and a SUPI and the GPSI are not necessarily in a one-to-one correspondence. One UE has only one SUPI, but one UE may have a plurality of GPSIs. Therefore, if a subscriber accesses different data networks, there are a plurality of GPSI identifiers. The network needs to establish a relationship between an external network GPSI and the SUPI. The UDM stores a mapping relationship between the GPSI and SUPI.

The UE locally stores or may temporarily generate the GPSI of the UE, and obtains the AKMA-key identifier A-KID in the procedure shown in FIG. 2.

In this embodiment of this application, the generic public subscription identifier GPSI or the AKMA-key identifier A-KID of the UE is carried in the discovery request. This can reduce a risk of exposing user privacy of the UE.

In a possible implementation, before the user equipment UE sends the discovery request to the application function AF, the UE may further first check whether confidentiality protection between the UE and the AF is activated. For example, refer to FIG. 9. For a specific implementation of determining, by the user equipment UE, whether confidentiality protection is activated for communication data between the user equipment UE and the application function AF in S901 in FIG. 9, refer to the foregoing detailed descriptions of enabling confidentiality protection. Details are not described herein again. After checking whether the confidentiality protection is activated, the UE may send the user plane message to the AF. Refer to step S902. If the confidentiality protection is activated, an identifier of the user equipment that is carried in the user plane message may be a permanent identifier or may be an encrypted identifier. If the confidentiality protection is inactivated, an identifier of the user equipment that is carried in the user plane message is an encrypted identifier. If the encrypted identifier is the generic public subscription identifier GPSI or the AKMA-key identifier A-KID of the UE, S902 corresponds to S701.

In a possible implementation, before the user equipment UE sends the discovery request to the application function AF, the UE may further first check whether integrity protection between the UE and the AF is activated. If the integrity protection is inactivated, the identifier of the UE that is included in the discovery request sent by the UE to the AF is the subscription concealed identifier of the UE. For a manner of checking whether the integrity protection is activated, refer to the foregoing descriptions. Details are not described herein and below again.

S702: The application function AF sends an authorization check request to a unified data management UDM device. The authorization check request includes the GPSI or the A-KID of the UE.

Specifically, the authorization check request sent by the AF to the UDM is used to determine whether the UE is authorized to communicate with the neighboring device. Only when the UE is authorized, the AF continues to, based on the discovery request sent by the UE, search for and discover the communicable device neighboring to the UE.

The UDM performs authorization check based on the permanent identifier of the UE. The identifier of the UE that is obtained by the AF from the discovery request of the UE is the GPSI or the A-KID. Therefore, the authorization request sent by the AF to the UDM includes the GPSI or the A-KID of the UE, and the UDM may obtain the permanent identifier of the UE based on the GPSI or A-KID.

In a current network architecture, the AF may directly or indirectly communicate with the UDM. This embodiment is described by using an example in which the AF may directly communicate with the UDM. It may be understood that, when one AF can only indirectly communicate with the UDM, for example, by using a network exposure function NEF, this embodiment may be automatically extended and adapted to the scenario. In this case, interaction between the AF and the UDM in this embodiment automatically includes an interaction process between the AF, the NEF, and the UDM.

S703: The unified data management UDM device determines a SUPI of the UE based on the GPSI or the A-KID of the UE, and performs the authorization check on the UE based on the SUPI.

Specifically, after receiving the authorization check request of the AF, the UDM obtains the GPSI or the A-KID in the authorization check request. It is assumed that the GPSI is obtained. Because the UDM stores the mapping relationship between the GPSI and the SUPI, the UDM may find the SUPI of the UE by using the GPSI as an index, and then perform the authorization check on the UE based on the SUPI.

It is assumed that the UDM obtains the AKMA-key identifier A-KID from the authorization check request. Because the UDM stores a mapping relationship between the A-KID and the SUPI, the UDM may find the SUPI of the UE by using the A-KID as an index, and then perform the authorization check on the UE based on the SUPI.

Specifically, that the UDM stores the mapping relationship between the A-KID and the SUPI may be implemented in the following manner: In the procedure shown in FIG. 2, after the AUSF generates the AKMA anchor key $K_{AKMK}$ and the AKMA-key identifier A-KID in step S206, the AUSF sends the generated AKMA-key identifier A-KID and/or the SUPI to the UDM, and the UDM stores the A-KID and the SUPI of the UE in association.

The authorization check performed by the UDM on the UE based on the SUPI may be implemented in the following manner: Whether the UE can be authorized to communicate with the neighboring device is specified in subscription information of the UE during registration, and the subscription information is stored in the UDM. In this case, after obtaining the subscription permanent identifier SUPI of the UE, the UDM searches for the subscription information of the UE based on the SUPI, to determine whether the UE is authorized to communicate with the neighboring device. If the subscription information specifies that the UE can communicate with the neighboring device, the authorization check performed on the UE succeeds; otherwise, the authorization check fails.

S704: The unified data management UDM device sends an authorization check response to the application function AF.

Specifically, if the authorization check performed on the UE succeeds in step S703, the authorization check response sent by the UDM to the AF indicates implicitly (for example, nothing is transferred) or explicitly (for example, a specific authorization result is sent, or a message carries a parameter relating to a proximity-based service of the UE) that the authorization check performed on the UE succeeds. In this case, the AF may further perform an operation of searching for and discovering a neighboring device that can communicate with the UE. Optionally, the authorization check response indicating that the authorization check performed on the UE succeeds may include the subscription permanent identifier SUPI of the UE, and the SUPI is used by the AF to subsequently interact with another core network element to obtain another parameter of the UE, for example, QoS information. Alternatively, the authorization check response indicating that the authorization check performed on the UE succeeds may not include the SUPI, or even may not include any valid information, and a null response is returned.

If the authorization check performed on the UE fails in step S703, the authorization check response sent by the UDM to the AF indicates that the authorization check performed on the UE fails. In this case, the AF cannot further perform an operation of searching for and discovering a neighboring device that can communicate with the UE.

Figures 8, 9:
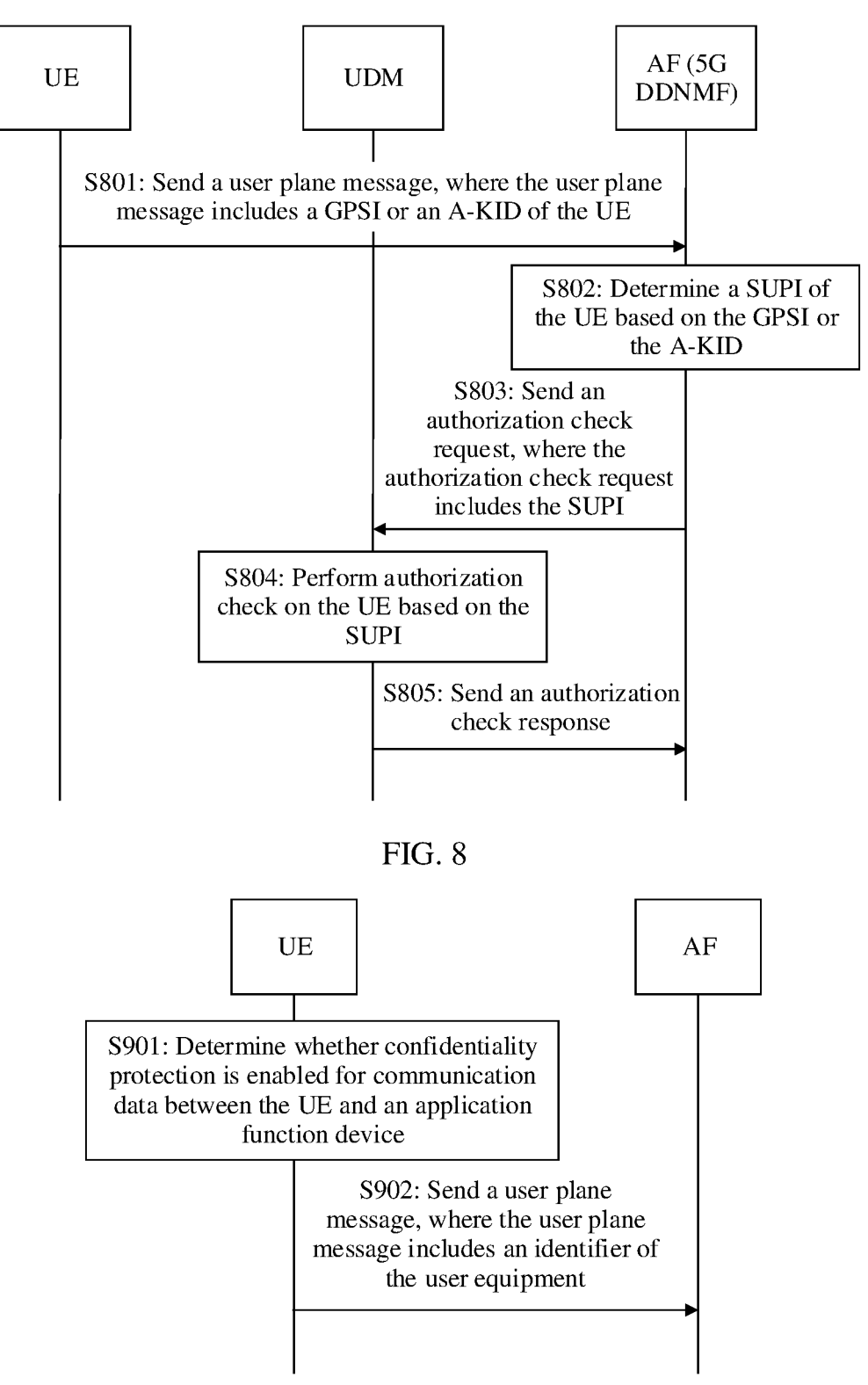

FIG. 8 shows an example of still another possible implementation in which the confidentiality protection policy is configured for communication information between the UE and the core network element in the process in which the UE sends the user plane message to the core network element to trigger further interactive communication. The implementation includes but is not limited to the following steps.

S801: The user equipment UE sends the user plane message to the application function AF. The user plane message includes a generic public subscription identifier GPSI or an AKMA-key identifier A-KID of the UE.

It should be noted that, in a 5G network, in a proximity-based service ProSe discovery procedure in a D2D scenario, the application function AF may be a direct discovery name management function 5G DDNMF in the 5G network. In this scenario, the user plane message that may be sent by the UE to the AF may be the discovery request (Discover Request) used to trigger discovery of the communicable device neighboring to the UE.

This application may be further applied to another communication scenario in addition to the D2D communication scenario. In this case, the user plane message sent by the UE to the AF may be another request message or the like. This is not limited in this solution. The following uses an example in which the user plane message is the discovery request (Discover Request).

Specifically, usually, the GPSI of the UE is an identifier of the UE used by the UE outside a core network, and a SUPI and the GPSI are not necessarily in a one-to-one correspondence. If a subscriber accesses different data networks, there are a plurality of GPSI identifiers. The network needs to establish a relationship between the GPSI and the SUPI. A UDM stores a mapping relationship between the GPSI and SUPI.

The UE locally stores the GPSI of the UE, and obtains the AKMA-key identifier A-KID in the procedure shown in FIG. 2.

In this embodiment of this application, the generic public subscription identifier GPSI or the AKMA-key identifier A-KID of the UE is carried in the discovery request. This can reduce a risk of exposing user privacy of the UE.

In a possible implementation, before the user equipment UE sends the discovery request to the application function AF, the UE may further first check whether confidentiality protection between the UE and the AF is activated. For example, refer to FIG. 9. For a specific implementation of determining, by the user equipment UE, whether confidentiality protection is activated for communication data between the user equipment UE and the application function AF in S901 in FIG. 9, refer to the foregoing detailed descriptions of enabling confidentiality protection. Details are not described herein again. After checking whether the confidentiality protection is activated, the UE may send the user plane message to the AF. Refer to step S902. If the confidentiality protection is activated, an identifier of the user equipment that is carried in the user plane message may be a permanent identifier or may be an encrypted identifier. If the confidentiality protection is inactivated, an identifier of the user equipment that is carried in the user plane message is an encrypted identifier. If the encrypted identifier is the generic public subscription identifier GPSI or the AKMA-key identifier A-KID of the UE, S902 corresponds to S801.

In a possible implementation, before the user equipment UE sends the discovery request to the application function AF, the UE may further first check whether integrity protection between the UE and the AF is activated. If the integrity protection is inactivated, the identifier of the UE that is included in the discovery request sent by the UE to the AF is the subscription concealed identifier of the UE. For a manner of checking whether the integrity protection is activated, refer to the foregoing descriptions. Details are not described herein and below again.

S802: The application function AF determines a SUPI of the UE based on the GPSI or the A-KID.

Specifically, the AF stores a mapping relationship between the A-KID and the SUPI, or the application function AF stores the mapping relationship between the GPSI and the SUPI of the UE, or the AF stores a mapping relationship between the GPSI, the A-KID, and the SUPI. In this case, the AF may find the SUPI of the UE by using the GPSI or the A-KID as an index.

The application function AF may store the mapping relationship between the A-KID and the SUPI of the UE in the following manner: In the procedure shown in FIG. 5A (or FIG. 5C), after the application security anchor function AAnF receives the application key obtaining request sent by the application function AF (the request carries the A-KID of the UE and the AF_ID of the AF) in step S5A03 (or step S5C03 in the figure), the AAnF determines, based on the identifier AF_ID of the AF, that the AF is a direct discovery name management function 5G DDNMF in the 5G network. Then, when sending the request response to the application function AF in step SA504 (or step S5C04 in the figure), the application security anchor function AAnF may send the subscription permanent identifier SUPI of the UE to the AF, and then the AF stores the SUPI of the UE and the AKMA-key identifier A-KID of the UE in association.

The application function AF may store the mapping relationship between the GPSI and the SUPI of the UE in the following manner: An application security anchor function AAnF may interact with an authentication server function AUSF to obtain the GPSI of the UE. For example, in the procedure shown in FIG. 2, when the AUSF sends the key registration request to the AAnF in step S207, the AUSF may send the GPSI to the AAnF. A manner in which the AUSF obtains the GPSI may be as follows: When the UDM sends the authentication vector response to the AUSF in step S204, the UDM sends the GPSI to the AUSF. Alternatively, an AAnF may send a request obtaining message to the UDM to request to obtain the GPSI of the UE. The request message may carry the SUPI of the UE. The UDM obtains the GPSI of the UE based on the SUPI, and sends the GPSI of the UE to the AAnF. After obtaining the GPSI of the UE, the AAnF stores the GPSI and the SUPI in association, or stores the GPSI, the A-KID, and the SUPI in association. Then, after the application security anchor function AAnF receives an application key obtaining request (the request carries the A-KID of the UE and the AF_ID of the AF) sent by the application function AF, the AAnF determines, based on the identifier AF_ID of the AF, that the AF is a direct discovery name management function 5G DDNMF in the 5G network. Then, when the application security anchor function AAnF sends the request response to the application function AF in step SA504 (or step S5C04), the application security anchor function AAnF may send the subscription permanent identifier SUPI of the UE and the GPSI of the UE together to the AF, and then the AF stores the SUPI of the UE and the GPSI of the UE in association, or the AF stores the SUPI and the GPSI of the UE and the AKMA-key identifier A-KID of the UE in association.

S803: The application function AF sends an authorization check request to a unified data management UDM device. The authorization check request includes the SUPI of the UE.

Specifically, the authorization check request sent by the AF to the UDM is used to determine whether the UE is authorized to communicate with the neighboring device. Only when the UE is authorized, the AF continues to, based on the discovery request sent by the UE, search for and discover the communicable device neighboring to the UE.

The UDM performs authorization check based on the permanent identifier of the UE. The identifier of the UE that is obtained by the AF from the discovery request of the UE is the subscription permanent identifier SUPI. Therefore, the authorization check request sent by the AF to the UDM includes the SUPI of the UE.

In a current network architecture, the AF may directly or indirectly communicate with the UDM. This embodiment is described by using an example in which the AF may directly communicate with the UDM. It may be understood that, when one AF can only indirectly communicate with the UDM, for example, by using a network exposure function NEF, this embodiment may be automatically extended and adapted to the scenario. In this case, interaction between the AF and the UDM in this embodiment automatically includes an interaction process between the AF, the NEF, and the UDM.

S804: The unified data management UDM device performs the authorization check on the UE based on the SUPI.

Specifically, whether the UE can be authorized to communicate with the neighboring device is specified in subscription information of the UE during registration, and the subscription information is stored in the UDM. In this case, after obtaining the subscription permanent identifier SUPI of the UE, the UDM searches for the subscription information of the UE based on the SUPI, to determine whether the UE is authorized to communicate with the neighboring device. If the subscription information specifies that the UE can communicate with the neighboring device, the authorization check performed on the UE succeeds; otherwise, the authorization check fails.

S805: The unified data management UDM device sends an authorization check response to the application function AF.

Specifically, if the authorization check performed on the UE succeeds in step S804, the authorization check response sent by the UDM to the AF indicates implicitly (for example, nothing is transferred) or explicitly (for example, a specific authorization result is sent, or a message carries a parameter relating to a proximity-based service of the UE) that the authorization check performed on the UE succeeds. In this case, the AF may further perform an operation of searching for and discovering a neighboring device that can communicate with the UE.

If the authorization check performed on the UE fails in step S804, the authorization check response sent by the UDM to the AF indicates that the authorization check performed on the UE fails. In this case, the AF cannot further perform an operation of searching for and discovering a neighboring device that can communicate with the UE.

It should be noted that, the foregoing procedures shown in FIG. 6 to FIG. 9 are implemented on a premise that the UE selects an AKMA interaction mode. In a possible implementation, in the procedures shown in FIG. 6 to FIG. 9, the UE selects a GBA interaction mode in a process of performing identity authentication between the UE and the core network, for example, in the procedures shown in FIG. 5B and FIG. 5D, and the possible implementations. In this case, the AKMA-key identifier A-KID in the procedures shown in FIG. 6 to FIG. 9 may be replaced with a bootstrapping transaction identifier B-TID, the application security anchor function (AAnF) is replaced with a bootstrapping service function (BSF), and the unified data management (UDM) is replaced with a home subscriber server (HSS), related descriptions in FIG. 5A, FIG. 5C, and FIG. 2 in step S802 are correspondingly replaced with related descriptions in FIG. 5B, FIG. 5D, and FIG. 3, and similar operations are performed on other network elements and implementation processes. Details are not described herein again.

In the foregoing procedures shown in FIG. 6 to FIG. 9, regardless of whether a secure communication policy is configured in an authorization check process between the UE and the core network, a user identifier with a privacy attribute is used for information exchanged between the UE and the AF. This reduces a risk of leaking the permanent identifier of the UE to reduce a risk of exposing user privacy.

In a possible implementation, the procedures shown in FIG. 6 to FIG. 9 are not necessarily performed after the procedures shown in FIG. 4 and FIG. 5A to FIG. 5D are completed, and the procedures shown in FIG. 6 to FIG. 9 may be initiated in any case. A specific scenario in which the procedures shown in FIG. 6 to FIG. 9 are initiated is not limited in this solution.

In a possible implementation, the procedure in which the AF initiates the authorization check to the UDM in FIG. 6 to FIG. 9 is not limited to being triggered by receiving the user plane message of the UE, and may be triggered by receiving a message of another device, for example, an access network device. This is not limited in this solution.

In a possible implementation, the procedure in which the AF initiates the authorization check to the UDM in FIG. 6 to FIG. 9 is not limited to checking whether the UE is authorized to communicate with the neighboring device, and may also be checking whether another device is authorized to communicate with the neighboring device, whether another device is authorized to participate in another procedure, or the like. This is not limited in this solution.

The foregoing mainly describes the secure communication method provided in embodiments of this application. It may be understood that, to implement the foregoing functions, each device includes a corresponding hardware structure and/or software module for performing each of the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the device may be divided into functional modules based on the foregoing method examples, for example, each functional module may be obtained through division based on each corresponding function, or two or more functions may be integrated into one module. The integrated module may be implemented in a form of hardware, or may be implemented in a form of a software functional module. It should be noted that, in embodiments of this application, division into modules is an example and is merely logical function division. During actual implementation, another there may be another division manner.

Figure 10:
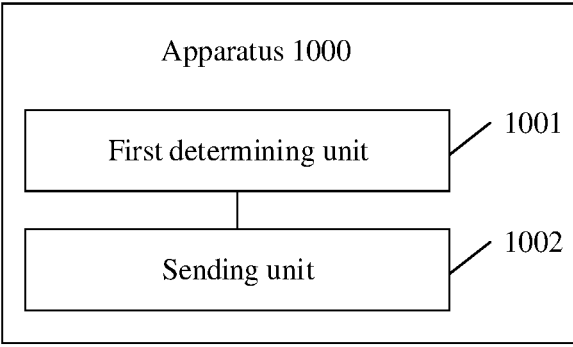
FIG. 10 to FIG. 12 are schematic diagrams of a logical structure of an apparatus according to an embodiment of this application.

When each functional module is obtained through division based on each corresponding function, FIG. 10 is a possible schematic diagram of a logical structure of an apparatus. The apparatus may be the user equipment, or may be a chip in the user equipment, or may be a processing system in the user equipment, or the like. The apparatus 1000 includes a first determining unit 1001 and a sending unit 1002.

The first determining unit 1001 is configured to determine whether confidentiality protection is activated for communication data between the apparatus 1000 and an application function device.

The sending unit 1002 is configured to send a user plane message to the application function device. The user plane message includes an identifier of the apparatus 1000, and the identifier is an encrypted identifier in a case in which the confidentiality protection is inactivated.

In a possible implementation, the apparatus 1000 further includes: a second determining unit, configured to determine to use a procedure with privacy protection, where the procedure with privacy protection is used for interaction between the apparatus 1000 and the application function device.

In a possible implementation, the procedure with privacy protection includes an authentication and key management for applications AKMA procedure.

In a possible implementation, the second determining unit is specifically configured to: determine to use the procedure with privacy protection when one or more of the following conditions are met: an application started by the apparatus 1000 indicates the apparatus 1000 to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the apparatus 1000 receives an indication of preferably selecting the procedure with privacy protection; the apparatus 1000 determines that the apparatus 1000 uses a 5G universal subscriber identity module; the apparatus 1000 determines that the apparatus 1000 has a valid public key and a valid private key; or the apparatus 1000 determines that the user plane message needs to carry a permanent identifier of the apparatus 1000.

In a possible implementation, the apparatus 1000 further includes: a receiving unit, configured to receive encryption algorithm information from the application function device; and the case in which the confidentiality protection is inactivated includes: a case in which the encryption algorithm information indicates that an encryption algorithm is a null algorithm.

In a possible implementation, the encrypted identifier is a subscription concealed identifier SUCI, a generic public subscription identifier GPSI, or an AKMA-key identifier A-KID.

In a possible implementation, the user plane message is a discovery request (Discovery request) in a proximity-based service ProSe procedure.

For specific operations and beneficial effect of the units in the apparatus 1000 shown in FIG. 10, refer to the descriptions in the methods and the possible implementations of the methods in FIG. 4 to FIG. 9. Details are not described herein again.

Figure 11:
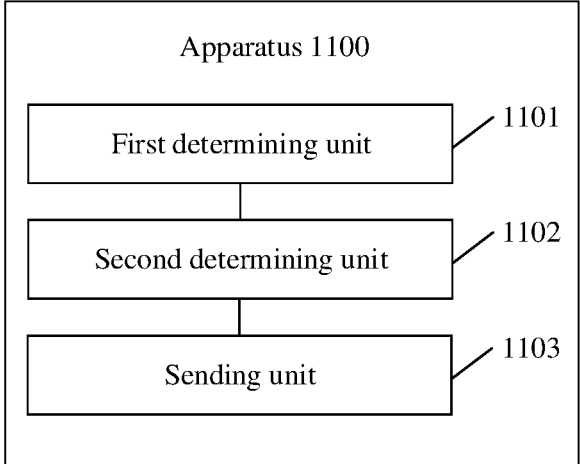

When each functional module is obtained through division based on each corresponding function, FIG. 11 is a possible schematic diagram of a logical structure of an apparatus. The apparatus may be the user equipment, or may be a chip in the user equipment, or may be a processing system in the user equipment, or the like. The apparatus 1100 includes a first determining unit 1101, a second determining unit 1102, and a sending unit 1103.

The first determining unit 1101 is configured to determine to use a procedure with privacy protection. The procedure with privacy protection is used for interaction between the apparatus 1100 and an application function device.

The second determining unit 1102 is configured to determine, based on the procedure with privacy protection, a communication key for interaction with the application function device and a non-null encryption algorithm.

The sending unit 1103 is configured to send a user plane message to the application function device. The user plane message includes an identifier of the apparatus 1100. Confidentiality protection is performed on the user plane message by using the communication key and the non-null encryption algorithm.

In a possible implementation, the first determining unit 1101 is specifically configured to: determine to use the procedure with privacy protection when one or more of the following conditions are met: an application started by the apparatus 1100 indicates the apparatus 1100 to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the apparatus 1100 receives an indication of preferably selecting the procedure with privacy protection; the apparatus 1100 determines that the apparatus 1100 uses a 5G universal subscriber identity module; the apparatus 1100 determines that the apparatus 1100 has a valid public key and a valid private key; or the apparatus 1100 determines that the user plane message needs to carry a permanent identifier of the apparatus 1100.

In a possible implementation, the second determining unit 1102 is specifically configured to: generate the communication key based on an anchor key stored in the second determining unit; send a request message to the application function device, where the request message includes a key identifier and information indicating to use the procedure with privacy protection, and the key identifier is used to assist the application function device in obtaining the communication key; and receive a response message from the application function device, where the response message includes information about the non-null encryption algorithm.

In a possible implementation, the request message further includes indication information for negotiating the non-null encryption algorithm.

In a possible implementation, the request message further includes information about an encryption algorithm supported by the apparatus 1100. The information about the encryption algorithm supported by the apparatus 1100 indicates the application function device to select a non-null encryption algorithm. The encryption algorithm supported by the apparatus 1100 is a non-null encryption algorithm.

For specific operations and beneficial effect of the units in the apparatus 1100 shown in FIG. 11, refer to the descriptions in the methods and the possible implementations of the methods in FIG. 4 to FIG. 9. Details are not described herein again.

Figure 12:
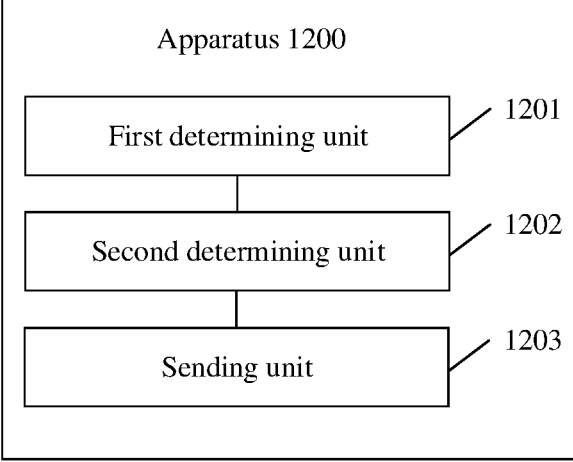

When each functional module is obtained through division based on each corresponding function, FIG. 12 is a possible schematic diagram of a logical structure of an apparatus. The apparatus may be the user equipment, or may be a chip in the user equipment, or may be a processing system in the user equipment, or the like. The apparatus 1200 includes a first determining unit 1201, a second determining unit 1202, and a sending unit 1203.

The first determining unit 1201 is configured to determine to use a procedure with privacy protection. The procedure with privacy protection is used for interaction between the apparatus 1200 and an application function device.

The second determining unit 1202 is configured to determine, based on the procedure with privacy protection, a communication key for interaction with the application function device.

The sending unit 1203 is configured to send a user plane message to the application function device. The user plane message includes an encrypted identifier of the apparatus 1200. Confidentiality protection is performed on the user plane message by using the communication key.

In a possible implementation, the procedure with privacy protection includes an authentication and key management for applications AKMA procedure.

In a possible implementation, the first determining unit 1201 is specifically configured to determine to use the procedure with privacy protection when one or more of the following conditions are met: an application started by the apparatus 1200 indicates the apparatus 1200 to select the procedure with privacy protection, where a server of the application is included in the application function device; the application indicates that one of a plurality of interaction procedures can be selected, where the plurality of interaction procedures include the procedure with privacy protection; the application indicates that one of a plurality of interaction procedures can be selected, where the plurality of interaction procedures include the procedure with privacy protection, and the procedure with privacy protection has a highest priority; the apparatus 1200 receives an indication of preferably selecting the procedure with privacy protection; the apparatus 1200 determines that the apparatus 1200 uses a 5G universal subscriber identity module; the apparatus 1200 determines that the apparatus 1200 has a valid public key and a valid private key; or the apparatus 1200 determines that the user plane message needs to carry a permanent identifier of the apparatus 1200.

For specific operations and beneficial effect of the units in the apparatus 1200 shown in FIG. 12, refer to the descriptions in the methods and the possible implementations of the methods in FIG. 4 to FIG. 9. Details are not described herein again.

Figure 13:
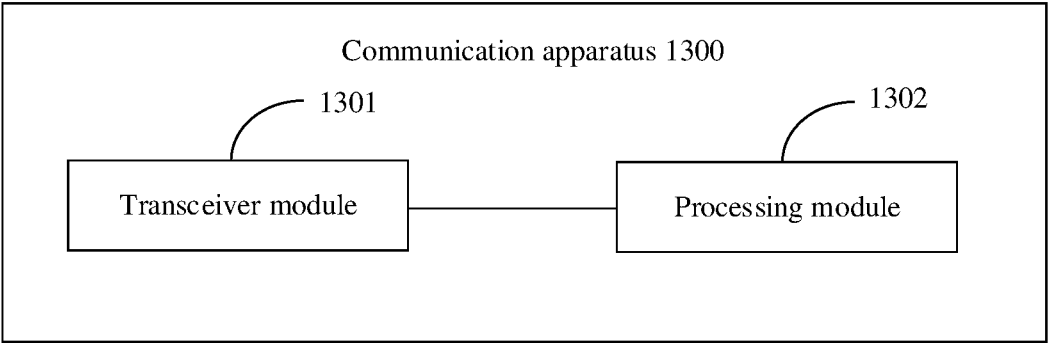
FIG. 13 is a schematic diagram of a structure of a communication apparatus according to an embodiment of this application.

FIG. 13 is a schematic diagram of a structure of a communication apparatus according to this application.

FIG. 13 is a schematic diagram of a structure of a communication apparatus according to this application. The communication apparatus 1300 shown in FIG. 13 includes a transceiver module 1301 and a processing module 1302.

In a design, the apparatus 1300 is user equipment.

For example, the processing module 1302 is configured to determine whether confidentiality protection is activated for communication data between the communication apparatus and an application function device.

The transceiver module 1301 is configured to send a user plane message to the application function device. The user plane message includes an identifier of the apparatus 1300, and the identifier is an encrypted identifier in a case in which the confidentiality protection is inactivated.

For example, the processing module 1302 is configured to: determine to use a procedure with privacy protection, where the procedure with privacy protection is used for interaction between the apparatus 1300 and the application function device; and determine, based on the procedure with privacy protection, a communication key for interaction with the application function device and a non-null encryption algorithm.

The transceiver module 1301 is configured to send a user plane message to the application function device. The user plane message includes an identifier of the apparatus 1300. Confidentiality protection is performed on the user plane message by using the communication key and the non-null encryption algorithm.

For example, the processing module 1302 is configured to: determine to use a procedure with privacy protection, where the procedure with privacy protection is used for interaction between the apparatus 1300 and the application function device; and determine, based on the procedure with privacy protection, a communication key for interaction with the application function device.

The transceiver module 1301 is configured to send a user plane message to the application function device. The user plane message includes an encrypted identifier of the apparatus 1300. Confidentiality protection is performed on the user plane message by using the communication key.

This example is used to implement a function corresponding to the user equipment in the methods in FIG. 4 to FIG. 9 and the possible implementations of the methods.

Figure 14:
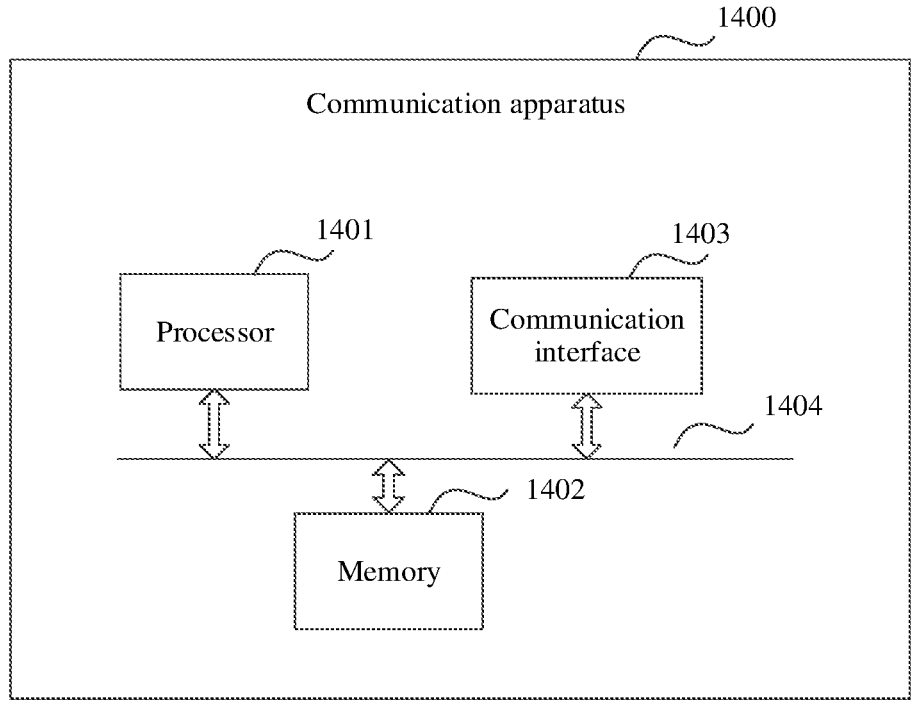
FIG. 14 is a schematic diagram of a structure of another communication apparatus according to an embodiment of this application.

FIG. 14 is a schematic diagram of a structure of another communication apparatus according to this application. The communication apparatus 1400 shown in FIG. 14 includes at least one processor 1401 and a memory 1402, and optionally, may further include a communication interface 1403.

The memory 1402 may be a volatile memory, for example, a random access memory; or the memory may be a non-volatile memory, for example, a read-only memory, a flash memory, a hard disk drive (HDD), or a solid-state drive (SSD); or the memory 1402 is any other medium that can be used to carry or store expected program code in a form of an instruction or a data structure and that can be accessed by a computer, but is not limited thereto. The memory 1402 may be a combination of the foregoing memories.

In embodiments of this application, a specific connection medium between the processor 1401 and the memory 1402 is not limited. In embodiments of this application, in the figure, the memory 1402 and the processor 1401 are connected through a bus 1404. The bus 1404 is represented by a bold line in the figure. A connection manner between other components is described merely as an example and does not constitute any limitation. The bus 1404 may be classified into an address bus, a data bus, a control bus, or the like. For ease of representation, only one bold line is for representing the bus in FIG. 14, but this does not mean that there is only one bus or only one type of bus.

The processor 1401 may have a data receiving and sending function, and can communicate with another device. In the apparatus shown in FIG. 14, an independent data receiving and sending module, for example, the communication interface 1403, may also be disposed to receive and send data. When communicating with the another device, the processor 1401 may transmit data through the communication interface 1403.

In an example, when user equipment uses the form shown in FIG. 14, the processor in FIG. 14 may invoke computer-executable instructions stored in the memory 1402, so that the user equipment performs the method performed by the user equipment according to any one of the foregoing method embodiments.

Specifically, functions/implementation processes of the processing module and the transceiver module in FIG. 13 may be implemented by the processor 1401 in FIG. 14 by invoking the computer-executable instructions stored in the memory 1402. Alternatively, a function/an implementation process of the processing module in FIG. 13 may be implemented by the processor 1401 in FIG. 14 by invoking the computer-executable instructions stored in the memory 1402; and a function/an implementation process of the transceiver module in FIG. 13 may be implemented through the communication interface 1403 in FIG. 14.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to embodiments are included in at least one embodiment of this application. Therefore, embodiments in the entire specification do not necessarily mean a same embodiment. In addition, these particular features, structures, or characteristics may be combined in one or more embodiments in any appropriate manner. It may be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

In this application, an element represented in a singular form is intended to represent "one or more", but does not represent "only one", unless otherwise specified. In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

"Predefine" in this application may be understood as "define", "predefine", "store", "pre-store", "pre-negotiate", "pre-configure", "solidify", or "pre-burn".

A person of ordinary skill in the art may understand that, for the purpose of convenient and brief description, for a detailed working process of the foregoing system, apparatus, and unit, refer to a corresponding process in the foregoing method embodiments. Details are not described herein again.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A secure communication method, comprising:
determining, by a communication apparatus, to implement a procedure with privacy protection of interaction between user equipment and an application function device when the communication apparatus determines that a user plane message will carry a permanent identifier of the user equipment;
determining, by the communication apparatus based on the procedure with privacy protection, a communication key for interaction with the application function device and a non-null encryption algorithm; and
sending, by the communication apparatus, the user plane message to the application function device, wherein the user plane message comprises the permanent identifier of the user equipment, and wherein confidentiality protection is performed on the user plane message by using the communication key and the non-null encryption algorithm.

2. The method according to claim 1, wherein the procedure with privacy protection comprises an authentication and key management for applications (AKMA) procedure.

3. The method according to claim 1, wherein determining, by the communication apparatus, to implement the procedure with privacy protection comprises:
determining, by the communication apparatus, to implement the procedure with privacy protection when an application started by the communication apparatus indicates the communication apparatus to select the procedure with privacy protection, wherein a server of the application is comprised in the application function device.

4. The method according to claim 1, wherein determining, by the communication apparatus, to implement the procedure with privacy protection comprises:

determining, by the communication apparatus, to implement the procedure with privacy protection when an application indicates that one of a plurality of interaction procedures can be selected, wherein the plurality of interaction procedures comprises the procedure with privacy protection, and a server of the application is comprised in the application function device.

5. The method according to claim 1, wherein determining, by the communication apparatus, to implement the procedure with privacy protection comprises:

determining, by the communication apparatus, to implement the procedure with privacy protection when an application indicates that one of a plurality of interaction procedures can be selected, wherein the plurality of interaction procedures comprises the procedure with privacy protection, the procedure with privacy protection has a highest priority of the plurality of interaction procedures wherein the plurality of interaction procedures comprises the procedure with privacy protection, and a server of the application is comprised in the application function device.

6. The method according to claim 1, wherein determining, by the communication apparatus, to implement the procedure with privacy protection comprises:

determining, by the communication apparatus, to implement the procedure with privacy protection when the communication apparatus receives an indication of preferably selecting the procedure with privacy protection.

7. The method according to claim 1, wherein determining, by the communication apparatus, to implement the procedure with privacy protection comprises:

determining, by the communication apparatus, to implement the procedure with privacy protection when the communication apparatus determines that the user equipment has a 5G universal subscriber identity module (SIM).

8. The method according to claim 1, wherein determining, by the communication apparatus, to implement the procedure with privacy protection comprises:

determining, by the communication apparatus, to implement the procedure with privacy protection when the communication apparatus determines that the user equipment has a valid public key and a valid private key.

9. The method according to claim 1, wherein the communication apparatus is the user equipment or a chip in the user equipment.

10. The method according to claim 1, wherein determining, by the communication apparatus based on the procedure with privacy protection, the communication key for interaction with the application function device and the non-null encryption algorithm comprises:

generating, by the communication apparatus, the communication key based on an anchor key stored in the communication apparatus;

sending, by the communication apparatus, a request message to the application function device, wherein the request message comprises a key identifier and information indicating to use the procedure with privacy protection, and the key identifier is used to assist the application function device in obtaining the communication key; and receiving, by the communication apparatus, a response message from the application function device, wherein the response message comprises information about the non-null encryption algorithm.

11. The method according to claim 10, wherein the request message further comprises indication information for negotiating the non-null encryption algorithm.

12. The method according to claim 10, wherein the request message further comprises information about an encryption algorithm supported by the communication apparatus, the information about the encryption algorithm supported by the communication apparatus indicates the application function device to select the non-null encryption algorithm, and the encryption algorithm supported by the communication apparatus is the non-null encryption algorithm.

13. A communication apparatus, wherein the communication apparatus comprises at least one processor coupled to at least one memory storing instructions, and configured to execute the instructions to cause the communication apparatus to:

determine to implement a procedure with privacy protection of interaction between user equipment and an application function device when the communication apparatus determines that a user plane message will carry a permanent identifier of the user equipment;

determine, based on the procedure with privacy protection, a communication key for interaction with the application function device and a non-null encryption algorithm; and send the user plane message to the application function device, wherein the user plane message comprises the permanent identifier to the user equipment, and wherein confidentiality protection is performed on the user plane message by using the communication key and the non-null encryption algorithm.

14. The communication apparatus according to claim 13, wherein the procedure with privacy protection comprises an authentication and key management for applications (AKMA) procedure.

15. The communication apparatus according to claim 13, wherein the instructions to determine to implement the procedure with privacy protection comprise instructions to determine to implement the procedure with privacy protection when one or more of the following conditions are met:

an application started by the communication apparatus indicates the communication apparatus to select the procedure with privacy protection, wherein a server of the application is comprised in the application function device;

the application indicates that one of a plurality of interaction procedures can be selected, wherein the plurality of interaction procedures comprises the procedure with privacy protection;

the communication apparatus receives an indication of selecting the procedure with privacy protection;

the communication apparatus determines that the user equipment has a 5G universal subscriber identity module;

the communication apparatus determines that the user equipment has a valid public key and a valid private key; or the communication apparatus determines that the user plane message carries the permanent identifier of the user equipment.

16. The communication apparatus according to claim 15, wherein the instructions to determine to implement the procedure with privacy protection comprises instructions to determine to implement the procedure with privacy protection when the application indicates that one of the plurality of interaction procedures can be selected, and the procedure with privacy protection has a highest priority of the plurality of interaction procedures.

17. The communication apparatus according to claim 13, wherein the communication apparatus is the user equipment or a chip in the user equipment.

18. A non-transitory computer-readable storage medium, storing a computer program, wherein when the computer program is executed, a communication apparatus is enabled to perform a method of:

determining to implement a procedure with privacy protection of interaction between user equipment and an application function device when determining that a user plane message will carry a permanent identifier of the user equipment;

determining, based on the procedure with privacy protection, a communication key for interaction with the application function device and a non-null encryption algorithm; and sending the user plane message to the application function device, wherein the user plane message comprises the permanent identifier of the user equipment and wherein confidentiality protection is performed on the user plane message by using the communication key and the non-null encryption algorithm.

19. The non-transitory computer-readable storage medium according to claim 18, wherein the procedure with privacy protection comprises an authentication and key management for applications (AKMA) procedure.

20. The non-transitory computer-readable storage medium according to claim 18, wherein instructions for determining to use the procedure with privacy protection comprise instructions for determining to use the procedure with privacy protection when one or more of the following conditions are met:

an application started by the communication apparatus indicates the communication apparatus to select the procedure with privacy protection, wherein a server of the application is comprised in the application function device;

the application indicates that one of a plurality of interaction procedures can be selected, wherein the plurality of interaction procedures comprises the procedure with privacy protection;

the communication apparatus receives an indication of preferably selecting the procedure with privacy protection;

the communication apparatus determines that the user equipment has a 5G universal subscriber identity module (SIM);

the communication apparatus determines that the user equipment has a valid public key and a valid private key; or the communication apparatus determines that the user plane message carries the permanent identifier of the user equipment.

* * * * *